US012240004B2

(12) United States Patent
Jeong et al.

(10) Patent No.: US 12,240,004 B2
(45) Date of Patent: Mar. 4, 2025

(54) DISH WASHER

(71) Applicant: LG Electronics Inc., Seoul (KR)

(72) Inventors: Min Jae Jeong, Seoul (KR); Jeongkon Kim, Seoul (KR); Jeong In Kim, Seoul (KR); Kijoong Kang, Seoul (KR); In Woo Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 602 days.

(21) Appl. No.: 17/508,461

(22) Filed: Oct. 22, 2021

(65) Prior Publication Data

US 2022/0126308 A1 Apr. 28, 2022

(30) Foreign Application Priority Data

Oct. 22, 2020 (KR) ........................ 10-2020-0137869

(51) Int. Cl.

*A47L 15/42* (2006.01)
*A47L 15/48* (2006.01)
*B05B 1/00* (2006.01)

(52) U.S. Cl.

CPC .......... *B05B 1/005* (2013.01); *A47L 15/4246* (2013.01); *A47L 15/4278* (2013.01); *A47L 15/48* (2013.01); *A47L 15/483* (2013.01); *A47L 15/486* (2013.01)

(58) Field of Classification Search

None
See application file for complete search history.

(56) References Cited

FOREIGN PATENT DOCUMENTS

| | | |
|---|---|---|
| DE | 102014215933 | 3/2016 |
| DE | 102015212863 | 1/2017 |
| DE | 102015212869 | 1/2017 |
| DE | 102015212880 | 1/2017 |
| EP | 2241242 | 10/2010 |
| EP | 3114979 | 8/2019 |
| WO | WO2013042036 | 3/2013 |
| WO | WO2018026221 | 2/2018 |

OTHER PUBLICATIONS

Riedel et al., "DE102015212869A1 English Machine Translation. pdf", Jan. 12, 2017—Machine translation from Espacenet.com.*
Extended European Search Report in European Appln. No. 21204154. 5, dated Feb. 24, 2022, 9 pages.

* cited by examiner

*Primary Examiner* — Levon J Shahinian
(74) *Attorney, Agent, or Firm* — Fish & Richardson P.C.

(57) ABSTRACT

A cap is configured to couple to a nozzle of a dish washer that is configured to supply air into a tub of the dish washer. The cap includes a lower cap configured to couple to an upper end portion of the nozzle, a flow cover configured to cover a part of the upper end portion of the nozzle, and an upper cap coupled to the lower cap and configured to, based on the cap being coupled to the nozzle, be spaced apart from and positioned above the nozzle and the flow cover. The cap defines a discharge opening configured to discharge air supplied to an inner space of the cap through the nozzle.

19 Claims, 18 Drawing Sheets

DISH WASHER

CROSS-REFERENCE TO RELATED APPLICATION

This application claims priority to and the benefit of Korean Patent Application No. 10-2020-0137869, filed on Oct. 22, 2020, the disclosure of which is incorporated herein by reference in its entirety.

TECHNICAL FIELD

The present disclosure relates to a dish washer, and more specifically, to a dish washer in which a drying unit is disposed under a tub and dry air is introduced into the tub through a nozzle installed in a bottom of the tub.

BACKGROUND

A dish washer may include a cabinet defining an overall exterior, a base that is installed under the cabinet and defines a bottom of the dish washer, a tub accommodating racks for holding dishes, a washing unit that sprays wash water to the tub at relatively high pressure to wash the dishes, and a drying unit that dries the washed dishes.

In some cases, the dish washer may include a sump for collecting and recirculating the wash water and a drain unit for draining used wash water, where the sump and the drain unit may be provided in a space between the tub and the base. In some cases, the drying unit may be also provided in the space between the tub and the base.

In some examples, the dish washer may have a structure in which a drying unit is disposed at a lower level than a tub and supplies dry air heated by the drying unit into the tub through a nozzle passing through a bottom of the tub.

In some cases, when a discharge end portion of the nozzle is exposed at a washing space, wash water may be introduced into the drying unit through the discharge end portion of the nozzle during a dish washing process. In some cases, a cap may be installed on an outer circumferential surface of the nozzle to hide the discharge end portion of the nozzle from the washing space to help prevent the phenomenon. For instance, the cap may surround the discharge end portion of the nozzle in a state in which the cap is spaced apart from the discharge end portion so that the cap may not hinder the dry air from being discharged from the discharge end portion of the nozzle.

In some examples, the dry air supplied through the nozzle may be finally discharged to an inner space of the tub, and the cap may include a discharge opening for discharging the air. In some cases, the wash water may be introduced through the discharge opening of the cap.

In some examples, the dish washer may have a structure of blocking a region close to the discharge opening of the cap in a region of the discharge end portion of the nozzle.

In some cases, where the blocking structure for blocking the wash water from permeating into the nozzle is applied to the discharge end portion of the nozzle, directivity issues of the nozzle in a circumferential direction of the nozzle may be raised. For example, if the nozzle has a circular pipe shape and the discharge end portion of the nozzle has the blocking structure, there may be cumbersomeness in arranging a direction of the blocking structure with a predetermined direction during an installation of the nozzle in the tub.

In some cases, the nozzle may be installed by inserting the discharge end portion of the nozzle upward so that the discharge end portion passes through the bottom of the tub from a space provided under the tub. In this case, when the blocking structure of the discharge end portion of the nozzle has an area greater than an area of the pipe shape of the nozzle, the nozzle may not be inserted into the tub, and thus the nozzle may be difficult to install. Accordingly, the blocking structure of the exposed end portion may be designed to be smaller than the area of the pipe shape of the nozzle, which may lead to a decrease of a flow cross-sectional area of the end portion of the nozzle and a flow loss.

In some cases, a nozzle blocking structure may have a shape which blocks a part of the discharge end portion, and an air discharge direction of the nozzle is directed upward, which may lead to a flow loss due to the shape.

In some examples, an inner space of the cap may define a path configured to discharge the air discharged from the nozzle to the washing space of the tub, where a direction of the dry air discharged from the nozzle may be changed in the cap. The dry air may be discharged through the discharge opening of the cap. In some cases, an angle formed by an upper plate of the cap and a sidewall of the cap at a direction change portion of the flow may be an acute angle, which may lead to a flow loss in changing the flow direction.

In some cases, a bottom of the cap may have a multilayer structure including a step, which may lead to a flow loss.

SUMMARY

The present disclosure describes a distribution cap of a nozzle, where the distribution cap can help prevent wash water from being introduced into the nozzle and facilitate installation of the nozzle.

The present disclosure also describes a distribution cap having a reduced flow resistance by increasing a discharge area of a nozzle.

The present disclosure further describes a distribution cap that can reduce or minimize a flow loss by changing a discharge direction of a nozzle.

The present disclosure further describes a cap having an inner structure that can reduce or minimize a flow resistance during a process of changing a flow direction of dry air discharged from a nozzle and a process of discharging the dry air.

The present disclosure further describes a dish washer including the distribution cap installed on a nozzle.

According to one aspect of the subject matter described in this application, a cap is configured to couple to a nozzle of a dish washer that is configured to supply air into a tub of the dish washer. The cap includes a lower cap configured to couple to an upper end portion of the nozzle, a flow cover configured to cover a part of the upper end portion of the nozzle, and an upper cap coupled to the lower cap and configured to, based on the cap being coupled to the nozzle, be spaced apart from and positioned above the nozzle and the flow cover. The cap defines a discharge opening configured to discharge air supplied to an inner space of the cap through the nozzle.

Implementations according to this aspect can include one or more of the following features. For example, the lower cap can include a fitting pipe configured to couple to the nozzle, and the flow cover can be disposed at the lower cap and extend upward relative to an upper end portion of the fitting pipe, where the flow cover covers a part of an upper portion of a flow cross section defined by the fitting pipe. In some examples, the discharge opening can face the part of the upper portion of the flow cross section covered by the flow cover, and the flow cover can have a hemispherical curved surface.

In some examples, the flow cover can define a discharge hole surrounded by a cut line along a part of the flow cover and a part of the fitting pipe, where the discharge hole can provide air from the nozzle to the inner space of the cap, and the cut line can include an upper line along the part of the flow cover and a lower line along the part of the fitting pipe. In some examples, a discharge cross section of the discharge hole can be defined by a plane connecting an upper end portion of the upper line and a lower end portion of the lower line, and a normal direction of the discharge cross section can be oriented upward with respect to a horizontal plane and define an angle less than or equal to 45 degrees with respect to the horizontal plane.

In some examples, a portion of the upper line can define an upper end portion of the hemispherical curved surface and extends downward in a vertical direction. In some examples, the lower cap can further include a plate member that extends outward from the fitting pipe in a radial direction, and the lower line can be connected to the plate member. In some examples, the plate member can define a fitting hole in fluid communication with the fitting pipe, where the fitting hole has (i) a closed end portion that is covered by the flow cover and (ii) an open end portion that is open toward the discharge hole. The lower line has a curved shape extending from a lower end portion of the upper line to the open end portion.

In some implementations, the lower cap can further include a coupling portion configured to couple to the nozzle and a plate member that extends outward from the coupling portion in a radial direction, where the upper cap is coupled to the plate member and configured to cover the nozzle and the flow cover, and the upper cap defines the inner space of the cap with the plate member. In some examples, the plate member can be inclined with respect to a horizontal plane. In some examples, the plate member can define a cap hole configured to discharge wash water introduced into the inner space of the cap through the discharge opening, where the cap hole passes through the plate member. In some implementations, the discharge opening can be defined by a gap between the plate member and the upper cap, where the gap is defined at a position adjacent to the cap hole.

In some implementations, the plate member can have an obtuse isosceles triangular shape having a vertex that defines an obtuse angle and a base side that faces the obtuse angle. The plate member can include the coupling portion disposed at a central portion of the plate member and configured to couple to the nozzle, where an end of the plate member includes the vertex and is located vertically above the base side.

In some implementations, the upper cap can include an upper shell disposed above the plate member and spaced apart from the plate member, and a sidewall shell that extends from an edge of the upper shell to the plate member and is connected to the plate member. In some examples, the upper shell can be inclined downward relative to a horizontal plane and away from the discharge opening. For example, the upper shell can be inclined at a predetermined angle with respect to the horizontal plane, and the lower cap can define a discharge hole facing an inner surface of the upper shell, where a discharge cross section of the discharge hole is defined by a plane connecting an upper end portion of the discharge hole and a lower end portion of the discharge hole. A normal direction of the discharge cross section can define an angle less than or equal to 45 degrees with respect to the inner surface of the upper shell.

In some implementations, the sidewall shell can include a discharge end portion that defines the discharge opening, and a direction change end portion disposed at a position opposite to the discharge opening. The direction change end portion can define (i) a first angle greater than 90 degrees with respect to an upper surface of the upper shell and (ii) a second angle greater than 90 degrees with respect to the plate member, where the coupling portion of the lower cap is disposed between the discharge end portion and the direction change end portion. In some examples, the plate member can have a substantially obtuse isosceles triangular shape having a vertex that defines an obtuse angle, isosceles sides that extend from the vertex, and a base side that faces the vertex, where the sidewall shell can include an inclined surface shell facing one of the isosceles sides and a discharge surface shell facing the base side. The direction change end portion can be defined by a portion of the sidewall shell connected to the vertex, and the discharge opening can be defined by a gap between the plate member and each of a lower end portion of the discharge surface shell and a lower end portion of the sidewall shell. The lower end portion of the sidewall shell can be connected to the discharge surface shell.

In some implementations, the sidewall shell can further include an eave that is curved from the lower end portion of the sidewall shell and that extends downward and away from the lower cap, where the eave defines at least a portion of the discharge opening, and an end portion of the eave is disposed vertically above the vertex of the plate member. In some examples, the lower cap can define a discharge hole facing an inner surface of the upper shell, and the discharge opening can extend laterally inward relative to an inner end of the discharge hole of the lower cap.

In some implementations, since the discharge opening may not be disposed at an excessively low position in the distribution cap, the dry air can be smoothly discharged to the washing space from the distribution cap.

In some implementations, a structure of blocking an opening of an upper end portion of a nozzle for blocking wash water from being introduced into the nozzle may not be provided in the nozzle, and the structure can be provided in a distribution cap. Accordingly, the nozzle may not have directivity, and thus the nozzle can be easily installed. In some examples, there are no limitations in shape and size of the structure of blocking the opening of the nozzle. Then, a design can be performed so that a shape, through which a direction of dry air discharged into an inner space of the distribution cap from the nozzle is changed to a desired direction, is easily implemented and a flow loss generated at a discharge end portion of the nozzle is minimized.

In some implementations, shapes of a fitting pipe and a flow cover implemented in a lower cap of the distribution cap can serve not only to block the nozzle so as to prevent introduction of the wash water but also to change a direction of the dry air discharged into the distribution cap from the nozzle while minimizing a flow loss at the same time.

In some implementations, due to a shape of an upper cap and a shape of a plate member, the flow loss of the dry air supplied into the distribution cap can be minimized, and the dry air can be discharged to the outside of the distribution cap at the same time.

DETAILED DESCRIPTION

Hereinafter, one or more implementations of the present disclosure will be described in detail with reference to the accompanying drawings.

In this application, a direction in which a door is installed with respect to a center of a dish washer in a state in which the dish washer is placed on a floor for use is defined as a forward direction. Accordingly, a direction toward an interior of the dish washer when the door is opened becomes a rearward direction. For the sake of convenience, the forward and rearward directions can be referred to as a first direction. Then the forward direction can be referred to as one direction of the first direction, and the rearward direction can be referred to as the other direction of the first direction.

In addition, a gravity direction can be defined as a downward direction, and a direction opposite to the gravity direction can be referred to as an upward direction.

In addition, a horizontal direction, that is, a width direction of the dish washer when the dish washer is viewed from in front of the door of the dish washer, perpendicular to the forward and rearward directions can be referred to as a left-right direction. For the sake of convenience, the left-right direction can be referred to as a second direction. Then, a right direction can be referred as one direction of the second direction, and a left direction can be referred to as the other direction of the second direction.

In addition, the above described upward and downward directions can be referred to as a third direction. Then, the upward direction can be referred to as one direction of the third direction, and the downward direction can be referred to as the other direction of the third direction.

Figure 1:
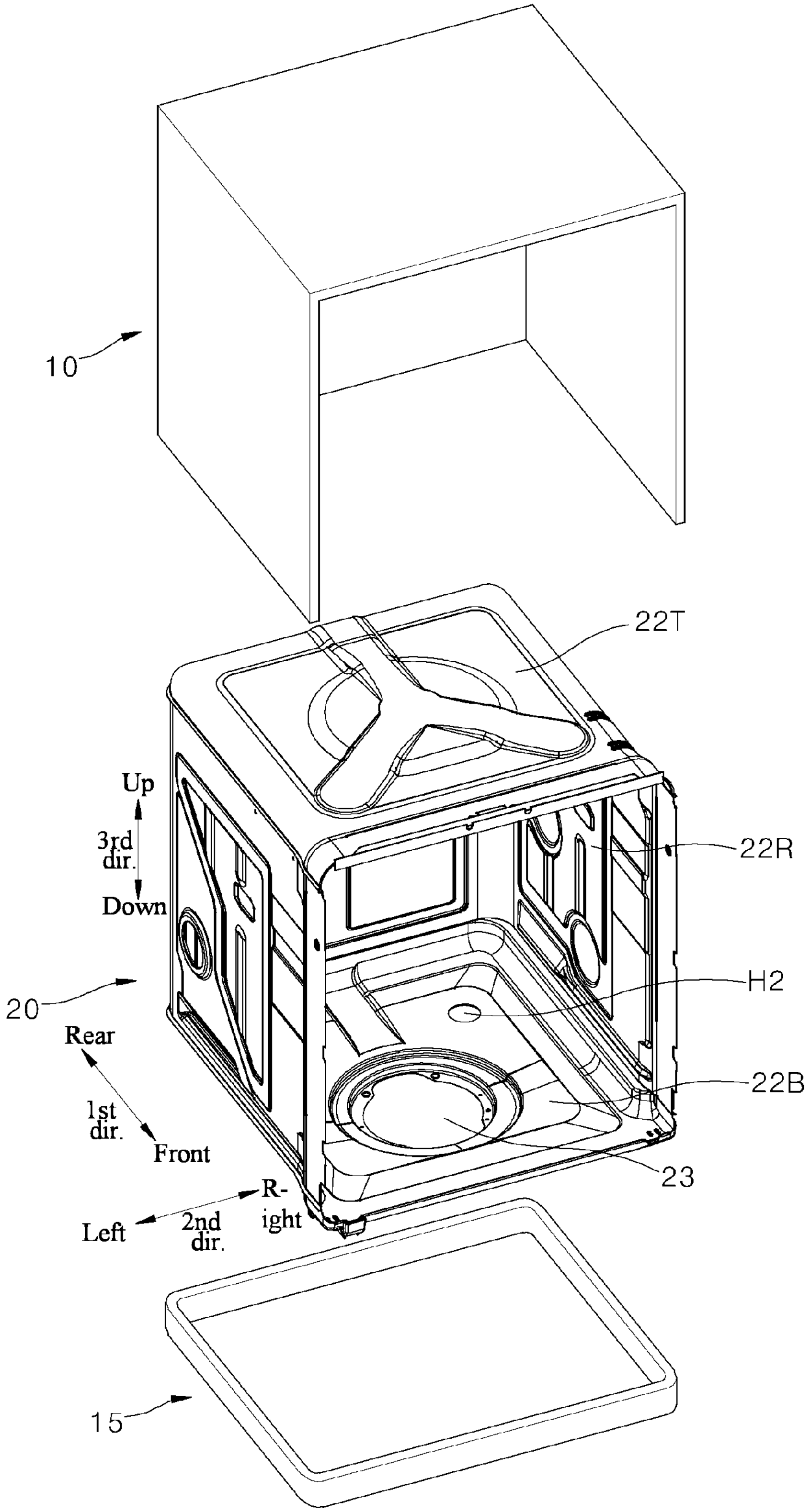
FIG. 1 is an exploded perspective view illustrating an example of a dish washer including a cabinet, a tub, and a base.
Figure 2:
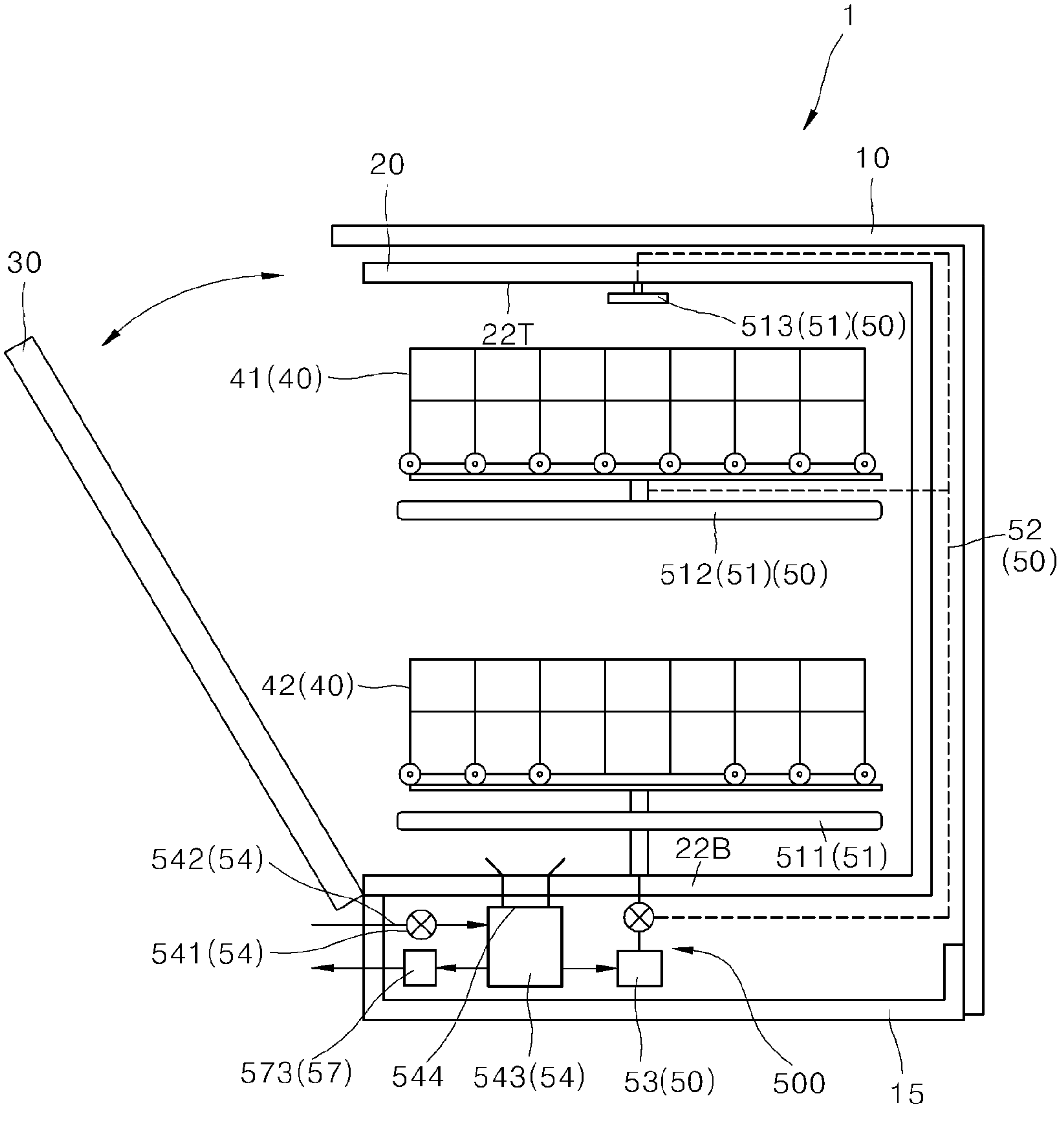
FIG. 2 is a side cross-sectional view illustrating example components of the dish washer.
Figure 3:
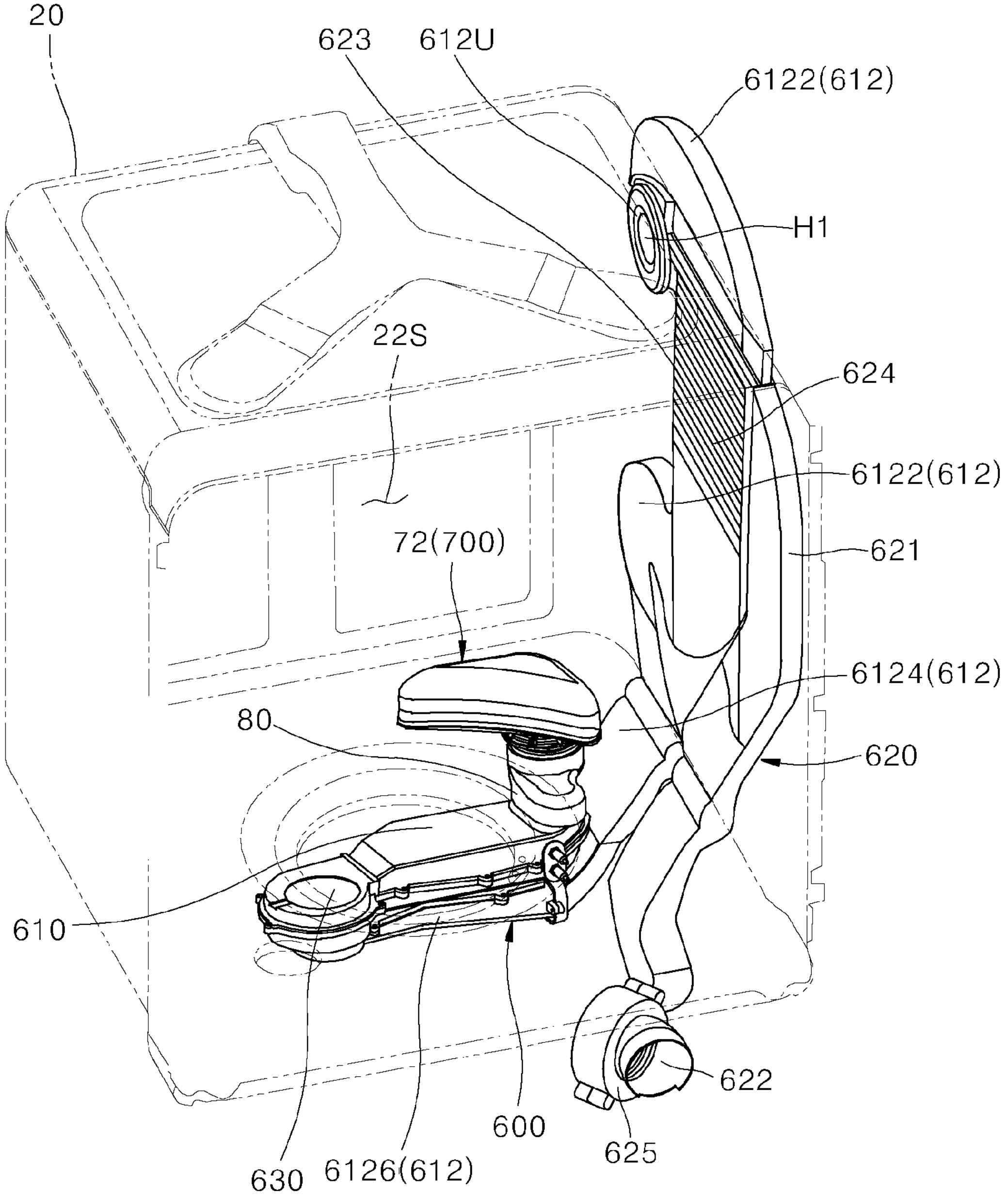
FIG. 3 is a perspective view illustrating example components relating to drying in the tub.
Figure 4:
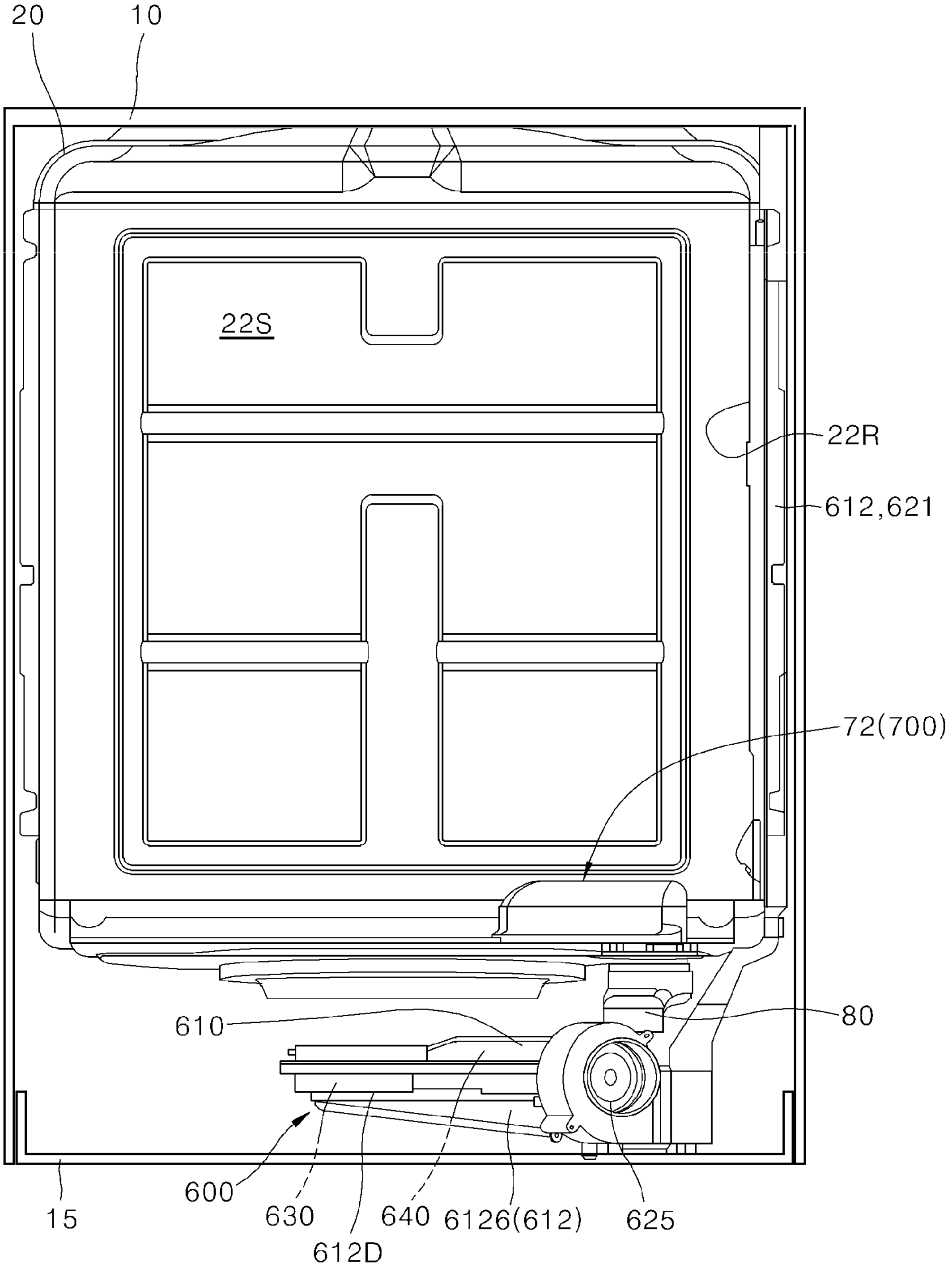
FIG. 4 is a front view illustrating the dish washer without a door and a washing unit.

FIG. 1 is an exploded perspective view illustrating examples of a cabinet 10, a tub 20, and a base 15 of a dish washer 1. FIG. 2 is a side cross-sectional view illustrating the dish washer 1 and example components relating to washing. FIG. 3 is a perspective view illustrating example components relating to drying that are installed in the tub 20. FIG. 4 is a front view illustrating the dish washer 1 when viewed in a state in which a door 30 and a washing unit 500 are omitted.

The dish washer 1 is formed as a substantially rectangular parallelepiped shape. The dish washer 1 includes the cabinet 10, the tub 20, the door 30, the base 15, the washing unit 500, and a drying unit 600.

The cabinet 10 can be a housing constituting exteriors of an upper surface, a left surface, a right surface, and a rear surface of the dish washer 1. The cabinet 10 can be manufactured by performing a press process on one or more metal plate members.

The base 15 is coupled to a lower end of the cabinet 10 to define a lower surface of the dish washer 1. When the dish washer 1 is installed at a desired place, the base 15 is placed on a floor. The base 15 can be made of, for example, a synthetic resin.

In some implementations, the tub 20 can have a rectangular parallelepiped box shape which is open in the forward direction. The tub 20 is fixedly accommodated in the cabinet 10. For example, the tub 20 can be manufactured by performing a press process on a metal plate member. An inner space defined by the tub 20 constitutes a washing space 22S.

The washing space 22S is opened or closed by the door 30 installed in front of the tub 20. The door 30 can be installed as a pull-down type to be rotatably opened or closed about a horizontal rotary shaft provided in a lower portion thereof.

The washing space 22S accommodates racks 40 capable of holding dishes. In some implementations, a structure in which two stages, that is, an upper rack 41 and a lower rack 42, are installed is illustrated. The racks 40 include wheels for facilitating withdrawal and input in the front-rear direction.

The washing unit 500 includes a water supply device 54, a spray device 50, and a drain unit 57.

The water supply device 54 includes a water supply path 542, a water supply valve 541 provided on the water supply path 542, and a sump 543 which collects supplied water. The water supply path 542 can be connected to a tap. The water supply device 54 controls the water supply valve 541 to be opened or closed to supply a desired amount of water into the dish washer 1. The water supplied through the water supply valve 541 and the water supply path 542 can be stored in the sump 543. The sump 543 is installed under the tub 20. A sump hole 23 is provided in a bottom member 22B of the tub 20, and the sump 543 is installed in the sump hole 23. The sump hole 23 is positioned in a central portion of a front portion of the bottom member 22B.

The spray device 50 includes a washing pump 53, a connection path 52, and spray arms 51. The washing pump 53 supplies the water supplied to the sump 543 through the water supply device 54 to the spray arms 51. The connection path 52 is a path through which the wash water supplied through the washing pump 53 is supplied to the spray arms

51. A suction part of the washing pump 53 is connected to the sump 543 and suctions the water stored in the sump 543, and a discharge part of the washing pump 53 is connected to the connection path 52 and supplies the high pressure wash water to the connection path 52. The spray arms 51 spray the wash water to the washing space 22S of the tub 20. The spray arms 51 include a lower spray arm 511 provided under a lower rack 42, an upper spray arm 512 provided under an upper rack 41, and a top spray arm 513 provided under a ceiling 22T of the tub 20. The upper spray arm 512 can be installed on the upper rack 41. The spray arms 51 can rotate and spray the wash water.

The wash water sprayed through the spray arms 51 washes the dishes and is collected in the sump 543 installed in the bottom of the tub 20 again. A filter 544 is installed in the sump 543 and filters food waste included in the wash water. The wash water collected in the sump 543 is resupplied to the spray arms 51 by the washing pump 53. When the circulating process of the wash water is repeated, the dishes can be washed and rinsed.

The drain unit 57 includes a drain pump 573 connected to the sump 543. The drain pump 573 discharges the water of the sump 543 to the outside.

Figure 5:
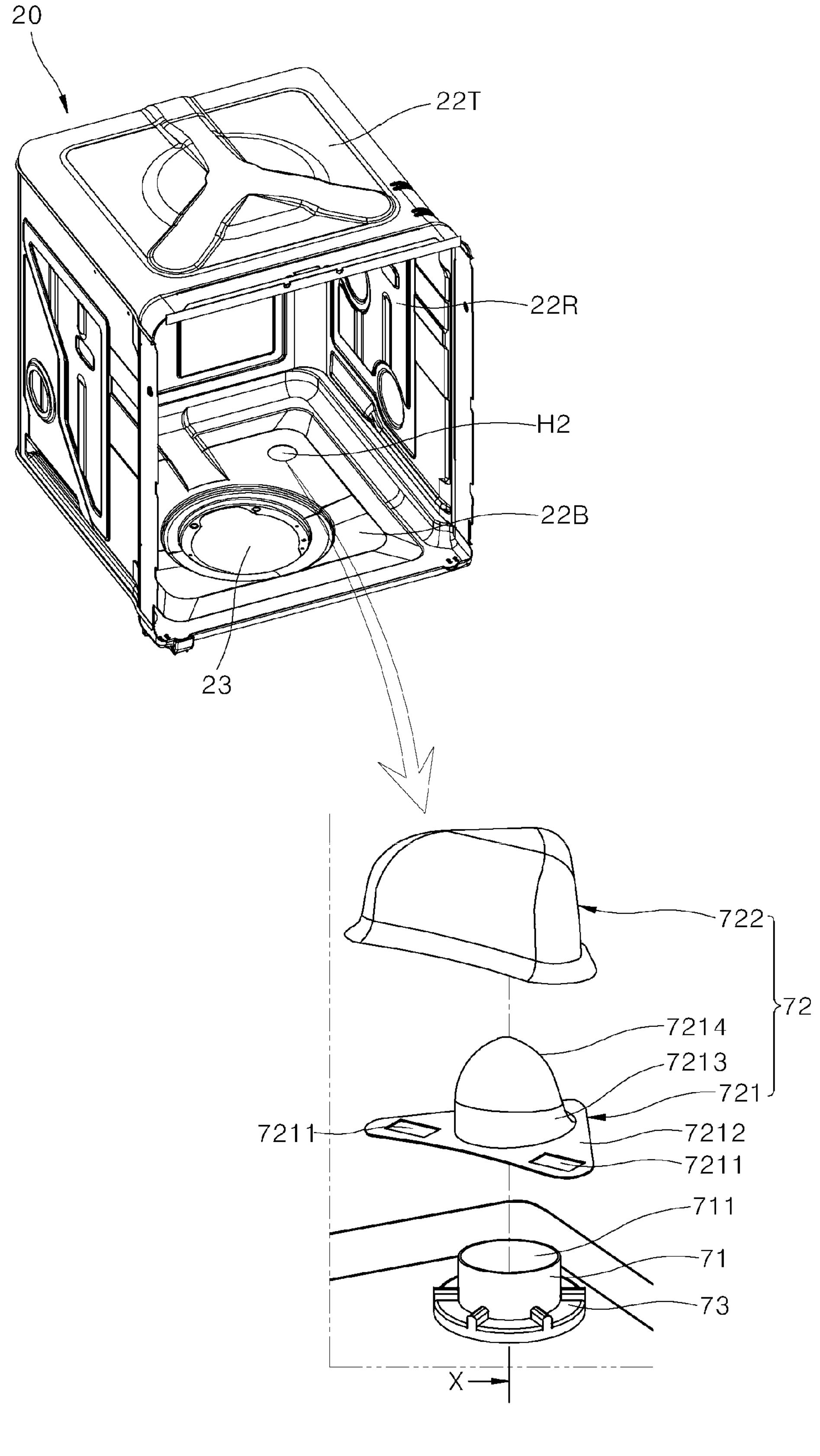
FIG. 5 is a view illustrating an example of an air discharge part installed in a bottom member of the tub.
Figure 6:
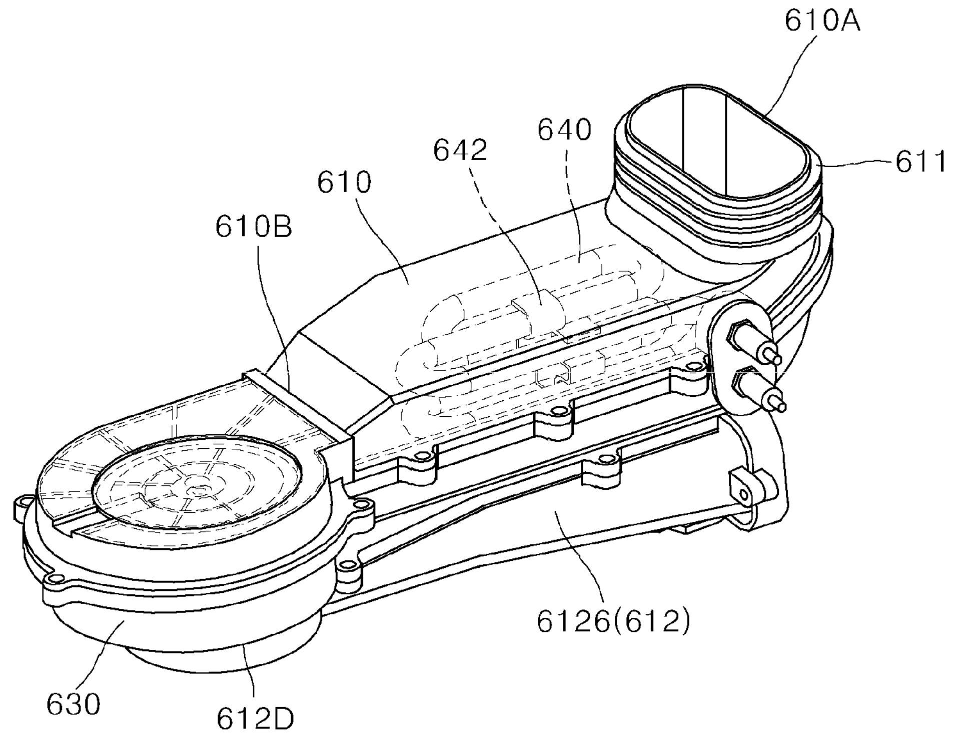
FIG. 6 is a perspective view illustrating an example of a drying unit disposed under the bottom member of the tub.
Figure 7:
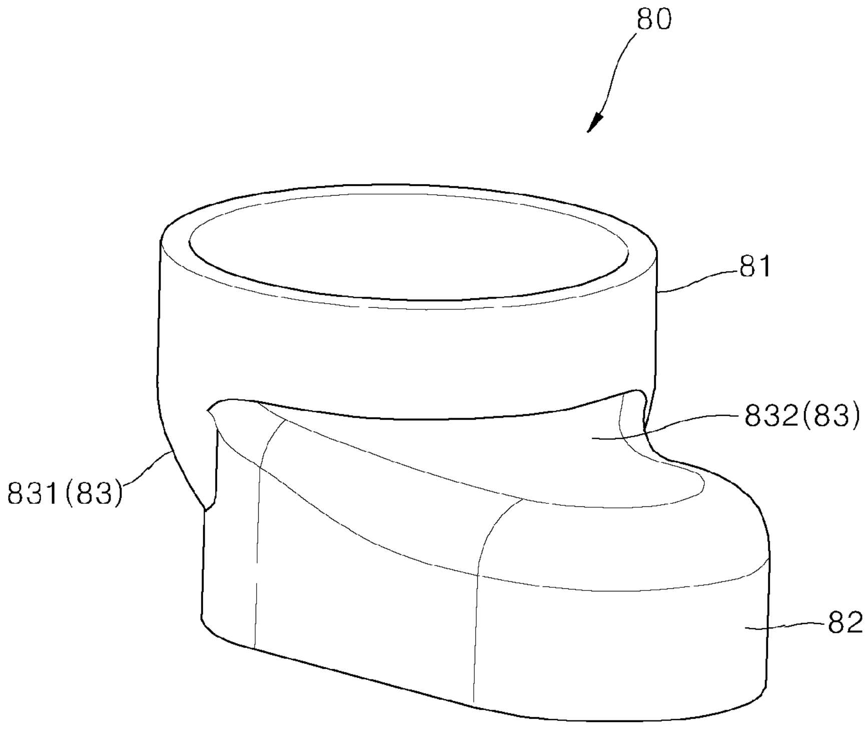
FIG. 7 is a perspective view illustrating an example of a connector which connects the air discharge part and the drying unit.
Figure 8:
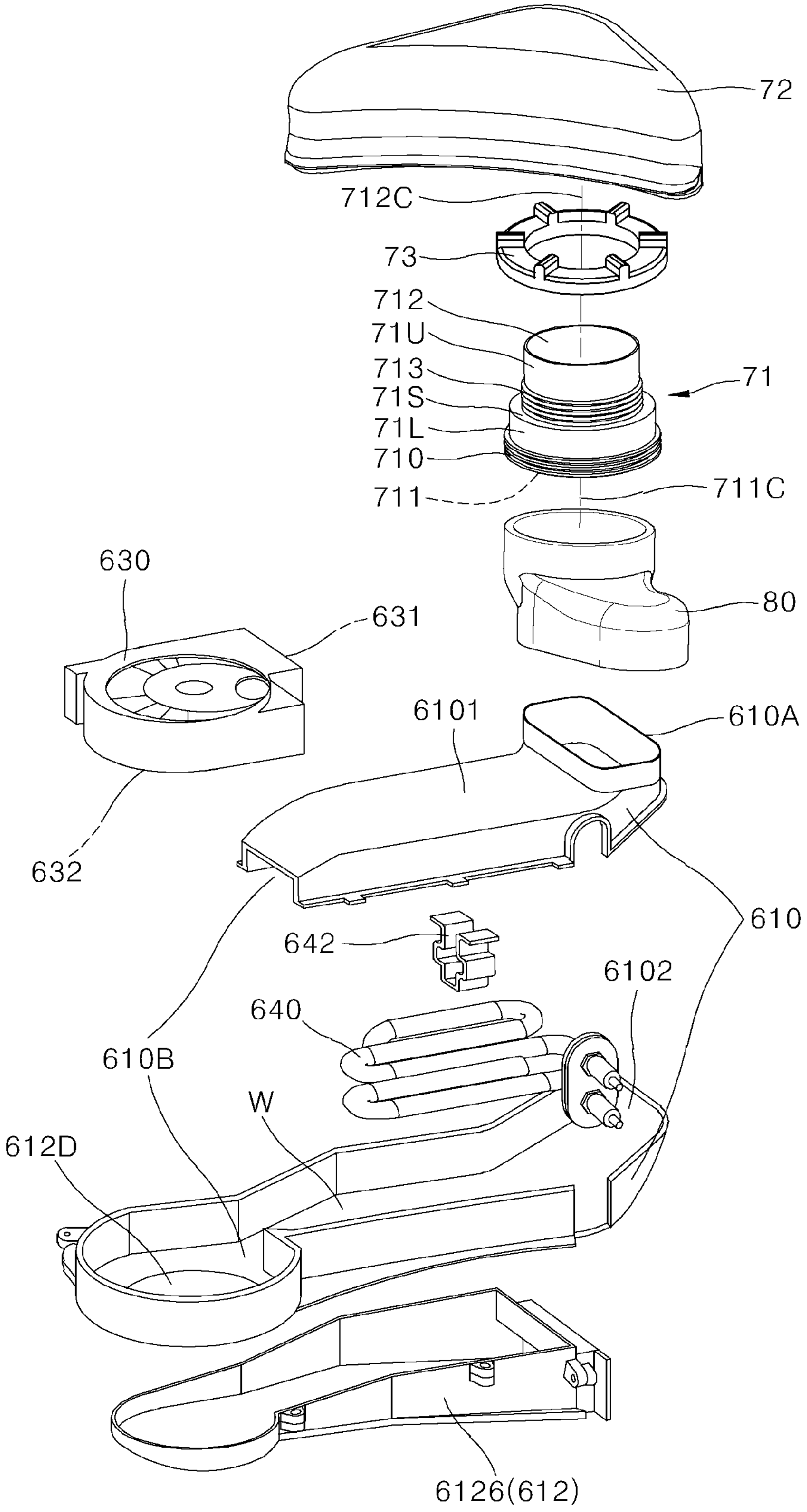
FIG. 8 is an exploded perspective view illustrating the air discharge part, the connector, and the drying unit.
Figure 9:
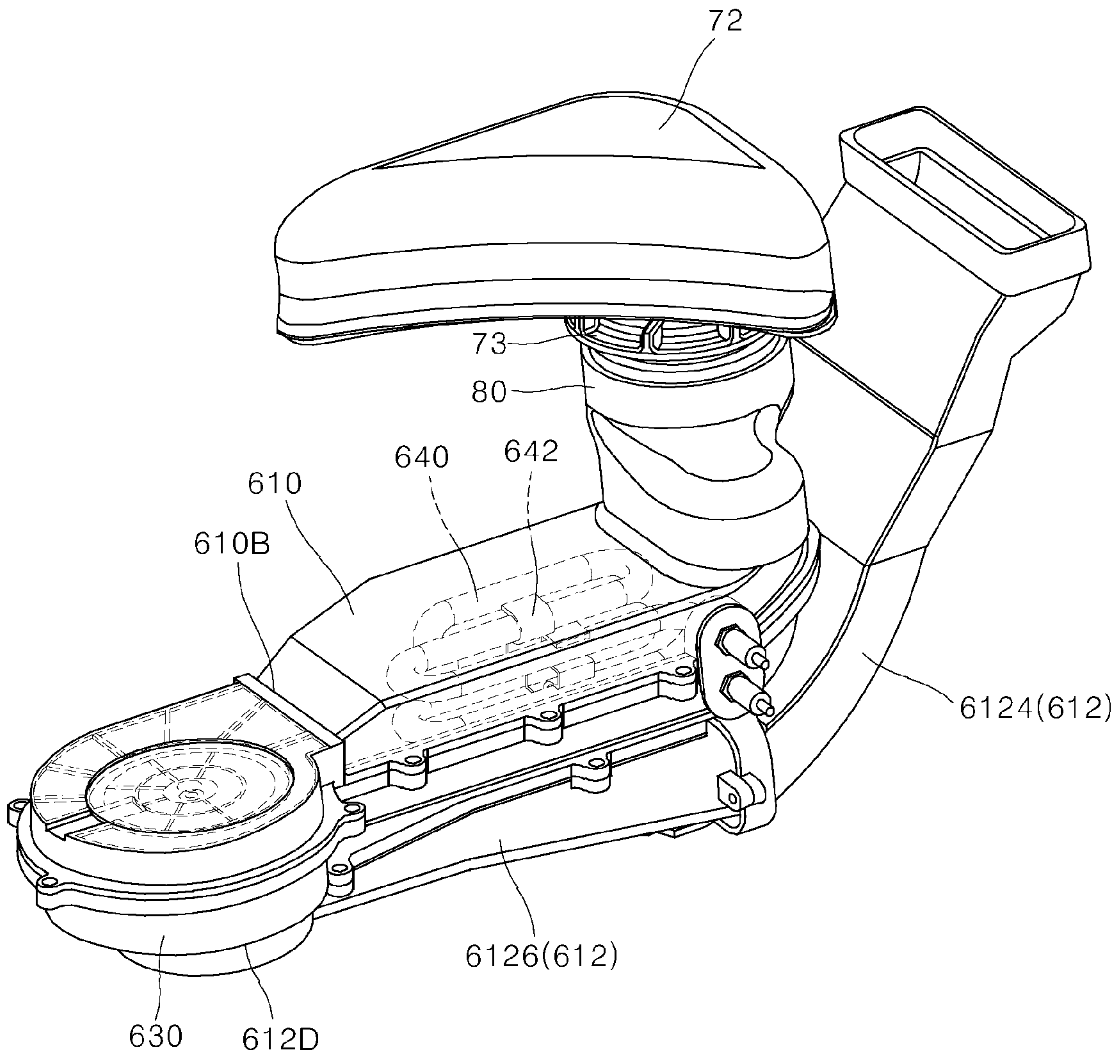
FIG. 9 is a perspective view illustrating an example state in which the air discharge part, the connector, and the drying unit are assembled.
Figure 10:
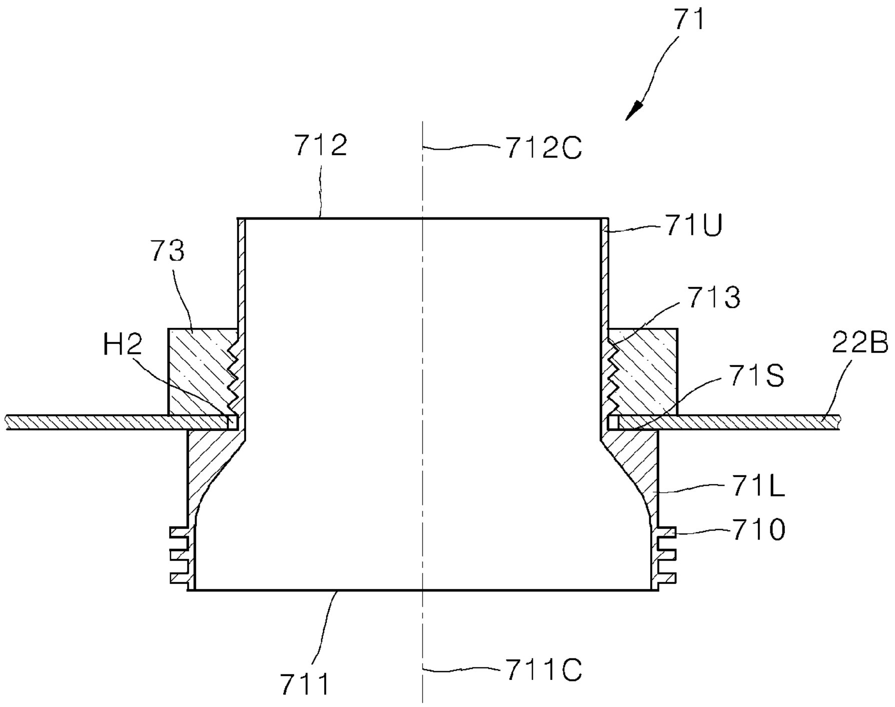
FIG. 10 is a cross-sectional view taken along line X of FIG. 5.

FIG. 5 is a view illustrating an example of an air discharge part 700 that is installed in the bottom member 22B of the tub 20. FIG. 6 is a perspective view illustrating the drying unit 600 disposed under the bottom member 22B of the tub 20. FIG. 7 is a perspective view illustrating an example of a connector 80 which connects the air discharge part 700 and the drying unit 600. FIG. 8 is an exploded perspective view illustrating the air discharge part 700, the connector 80, and the drying unit 600. FIG. 9 is a perspective view illustrating an example state in which the air discharge part 700, the connector 80, and the drying unit 600 are assembled. FIG. 10 is a cross-sectional view taken along line X of FIG. 5.

Referring to FIGS. 3 and 5 to 10, the drying unit 600 of the dish washer 1 includes a drying duct 610. The drying duct 610 of the drying unit 600 is formed by coupling an upper member 6101 and a lower member 6102. The drying duct 610 is disposed under the tub 20. A heater 640, which heats air flowing in the drying duct 610, is fixed by a fixing part 642 in the drying duct 610. The drying duct 610 can be formed of a metal material in order to be prevented from being deformed by heat of the heater 640. For example, the drying duct 610 can be manufactured by performing metal die casting. However, the drying duct 610 can also be manufactured of a synthetic resin having high heat resistance in addition thereto.

The drying duct 610 includes a duct entrance 610B and a duct exit 610A. The duct exit 610A of the drying duct 610 is formed to protrude upward from one end portion of the drying duct 610 in a longitudinal direction. The duct entrance 610B of the drying duct 610 is provided in the other end portion of the drying duct 610 in the longitudinal direction. A flow cross section of the drying duct can have a rectangular shape which is wide in a lateral direction. This shape is a shape which can sufficiently secure a flow cross-sectional area of the drying duct 610 even when a space between the bottom member 22B of the tub 20 and the base 15 is small. The drying duct 610 extends substantially in a horizontal direction.

The duct exit 610A can extend in the third direction. A flow cross section defined by the duct exit 610A of the drying duct 610 can have a track shape having a long axis and a short axis. In some examples, a width direction of the flow cross section of the drying duct 610 is the same as a direction of the long axis of the flow cross section of the duct exit 610A. Accordingly, a flow resistance generated when the air flowing in the drying duct 610 flows to the duct exit 610A can be minimized.

An outlet H2 is provided in the bottom member 22B of the tub 20. The outlet H2 is provided at a right side (one side) of a rear portion of the bottom member 22B. A nozzle 71 is installed to pass through the outlet H2, and a distribution cap 72, which will be described below, covers a portion of the nozzle 71 exposed upward from the bottom member 22B of the tub 20. In addition, a portion of the nozzle 71 exposed downward from the bottom member 22B of the tub 20 is connected to the duct exit 610A provided on a downstream end of the drying duct 610 through the connector 80.

When the duct exit 610A has a track shape, there are no corners angled along an outer circumferential surface of the duct exit 610A. Accordingly, when a duct side connection end portion 82 of the connector 80 surrounds and is press fitted to the outer circumferential surface of the duct exit 610A, the duct side connection end portion 82 of the connector 80 is uniformly deformed in a circumferential direction, and thus there is no worry of excessive deformation of any one portion thereof. Accordingly, the duct side connection end portion 82 of the connector 80, which is formed of a flexible material, for example, a rubber material, may not be damaged or torn.

A discharge part 631 of a fan 630 is connected to the duct entrance 610B provided at an upstream end of the drying duct 610. That is, the fan 630 is disposed upstream from the heater 640 in the drying duct 610 so that air flows toward the downstream end of the drying duct 610, that is, toward the heater 640. Then, heat of the heater 640 can be prevented from influencing the fan 630, and the air heated by the heater 640 can be supplied to the nozzle 71 through the connector 80. The heated air is supplied into the tub 20 through the nozzle 71 and the distribution cap 72. That is, the nozzle 71 and the distribution cap 72 constitute the air discharge part 700 through which the dry air is supplied to the tub 20.

When the drying unit 600 includes the drying duct 610, the heater 640, the fan 630, the connector 80, the nozzle 71, and the distribution cap 72 as described above, the drying unit 600 suctions external air through a suction part 632 of the fan 630, the external air is heated by the heater, the heated air is supplied into the tub 20 to dry the dish, and the air which has dried the dish can be naturally discharged in an open pathway manner.

In addition, the drying unit 600 can be used in a closed circulation manner. For example, the drying unit 600 further includes a condensing duct 612 which returns air in the tub 20 toward the drying duct 610.

Referring to FIGS. 3 and 4, an inlet H1 is provided in a rear upper portion of one sidewall 22R which defines a right wall of the tub 20. The inlet H1 is provided to pass through the one sidewall 22R so that the inner space and an outer space of the tub 20 communicate with each other. The condensing duct 612 is installed on an outer surface of the one sidewall 22R. An upstream end 612U of the condensing duct 612 is connected to the inlet H1, and a downstream end 612D of the condensing duct 612 is connected to the suction part 632 of the fan 630 to be finally connected to the upstream end 612U of the drying duct 610.

In some implementations, the condensing duct 612 is illustrated as a structure divided into a first condensing duct 6122, a second condensing duct 6124, and a third condensing duct 6126. For example, the first condensing duct 6122 is disposed between the one sidewall 22R of the tub 20 and the cabinet 10, the third condensing duct 6126 is disposed between the bottom member 22B of the tub 20 and the base 15, and the second condensing duct 6124 is disposed between and connects the first condensing duct 6122 and the third condensing duct 6126.

The condensing duct 612 disposed between the one sidewall 22R of the tub 20 and the cabinet 10 is exposed to an external atmosphere at room temperature through the cabinet 10. Accordingly, hot humid air which has dried the dish in the tub 20 is condensed in the condensing duct 612 and condenses water vapor again. The condensed water can be moved, for example, to the sump 543 and discharged to the outside through the drain pump 573.

The drying unit 600 of a closed circulation type can further include a cold air supply part 620 in order to promote condensation of humid air flowing in the condensing duct 612.

The cold air supply part 620 includes a cooling duct 621 which forcibly moves external air. A suction end portion 622 of the cooling duct 621 can be disposed, for example, at a front side in a space provided under the tub 20 and can open in the forward direction. In addition, a cooling fan 625 can be installed at a corresponding position and can suction air in front of the dish washer 1 and supply the air to the cooling duct 621.

The cooling duct 621 further includes a heat exchanger 624. The cooling duct 621 is in contact with the condensing duct 612 in the heat exchanger 624. While the heat exchanger 624 isolates room temperature air flowing in the cooling duct 621 from hot humid air flowing in the condensing duct 612 to prevent mixing therebetween, the heat exchanger 624 secures a maximum direct contact area between the cooling duct 621 and the condensing duct 612 to promote heat exchange between the air in the cooling duct 621 and the air in the condensing duct 612.

The air, which has passed through the heat exchanger 624, in the cooling duct 621 is discharged to the outside through a discharge end portion 623. In some implementations, the heat exchanger 624 including the discharge end portion 623 is illustrated.

FIGS. 5 and 8 to 10 will be referred. The circular outlet H2 is open at one side of rear of the bottom member 22B of the tub 20. The nozzle 71 has a circular pipe shape which extends vertically, and an outer diameter of an upper portion 71U of the nozzle 71 is smaller than an outer diameter of a lower portion 71L of the nozzle 71. That is, a step 71S at which the outer diameter is changed is provided substantially at a middle portion of the nozzle 71 in a height direction. The outer diameter of the upper portion 71U of the nozzle 71 is smaller than an inner diameter of the outlet H2, and the outer diameter of the lower portion 71L of the nozzle 71 is greater than the inner diameter of the outlet H2. Accordingly, the upper portion of the nozzle 71 can be inserted into the tub 20 through the outlet H2 from under the tub 20.

In a state in which the upper portion 71U of the nozzle 71 is inserted through the outlet H2, a thread 713 provided on an outer circumference of the nozzle 71 and exposed upward from the bottom member 22B can be screw-coupled to a fastener 73. An outer diameter of the fastener 73 is greater than an outer diameter of the outlet H2. Accordingly, as illustrated in FIG. 5, when the fastener 73 is screw-coupled to the outer circumference of the nozzle 71 on the bottom member 22B, the bottom member 22B is compressed in a state in which the bottom member 22B is interposed between a lower surface of the fastener 73 and the step 71S of the nozzle 71, and thus, the nozzle 71 is fixed to the bottom member 22B of the tub 20. A sealing member for preventing leaking of wash water can be interposed between the fastener 73 and the bottom member 22B.

The nozzle 71 which is fixed by passing through the bottom member 22B of the tub 20 has the pipe shape extending vertically. The nozzle 71 can be divided into the upper portion 71U having a small diameter and the lower portion 71L having a large diameter based on the step 71S. The upper portion 71U of the nozzle 71 includes a second opening 712 which is open upward, and the lower portion 71L of the nozzle 71 includes a first opening 711 which is open downward. The first opening 711 and the second opening 712 can have the same shape. In some implementations, both of the first opening 711 and the second opening 712 are illustrated to have circular cross sections. A flow cross section central axis 711C of the first opening 711 can be the same as a flow cross section central axis 712C of the second opening 712. Accordingly, a flow resistance generated by the nozzle 71 can be minimized.

An inner diameter of the first opening 711 is greater than an inner diameter of the second opening 712. Since air flowing in the nozzle 71 flows from the first opening 711 to the second opening 712, a flow cross-sectional area is reduced, and thus a flow velocity increases. A connecting portion between the upper portion 71U and the lower portion 71L, that is, an inner circumferential surface of a portion of the step 71S, constitutes a gently inclined surface to reduce an air resistance.

The nozzle 71 can be manufactured by molding a synthetic resin. For example, the nozzle 71 can be manufactured by injection molding.

In a state in which the nozzle 71 is fixed to the bottom member 22B as described above, the distribution cap 72 is installed on an upper end of the nozzle 71.

Referring to FIGS. 7 to 9, in some implementations, the connector 80 can be formed of a rubber material which is flexible and has a certain degree of stiffness. The rubber material has high heat resistance and low thermal conductivity.

The connector 80 includes the duct side connection end portion 82 coupled to the duct exit 610A. The duct side connection end portion 82 covers the outer circumferential surface of the duct exit 610A and is coupled to the duct exit 610A. An outer circumferential protrusion 611 is provided on the outer circumferential surface of the duct exit 610A in a circumferential direction to seal the outer circumferential surface so as to prevent generation of a gap between an inner circumferential surface of the duct side connection end portion 82 and the outer circumferential surface of the duct exit 610A.

The connector 80 includes a nozzle side connection end portion 81 connected to a lower end portion of the nozzle 71. An outer circumferential protrusion 710 is provided on an outer circumferential surface of the lower portion 71L of the nozzle 71 in a circumferential direction to seal the outer circumferential surface so as to prevent generation of a gap between an inner circumferential surface of the nozzle side connection end portion 81 and the outer circumferential surface of the lower portion 71L of the nozzle 71.

Figure 11:
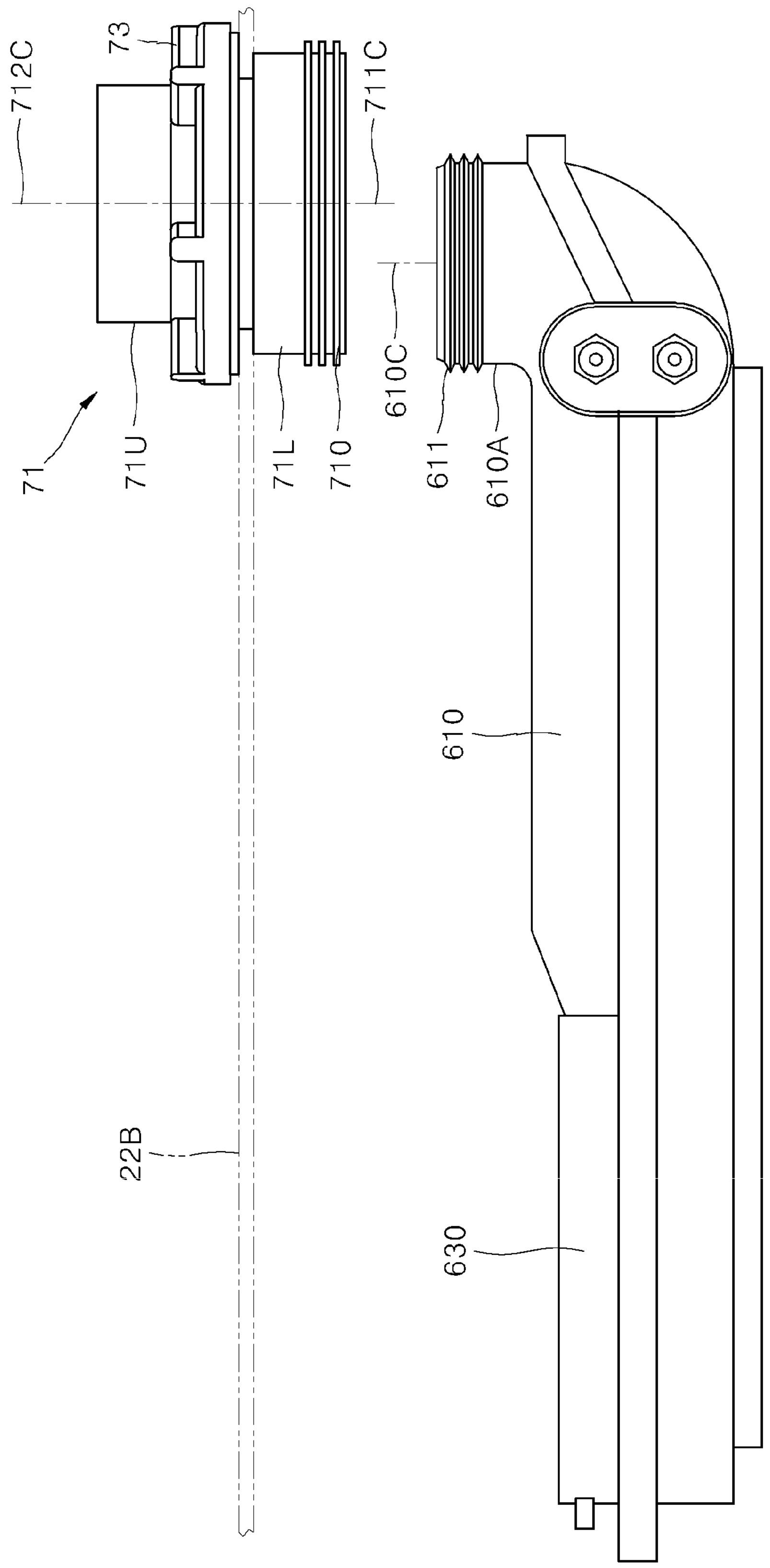
FIG. 11 is a front view illustrating examples of a nozzle and a drying duct without the connector.
Figure 12:
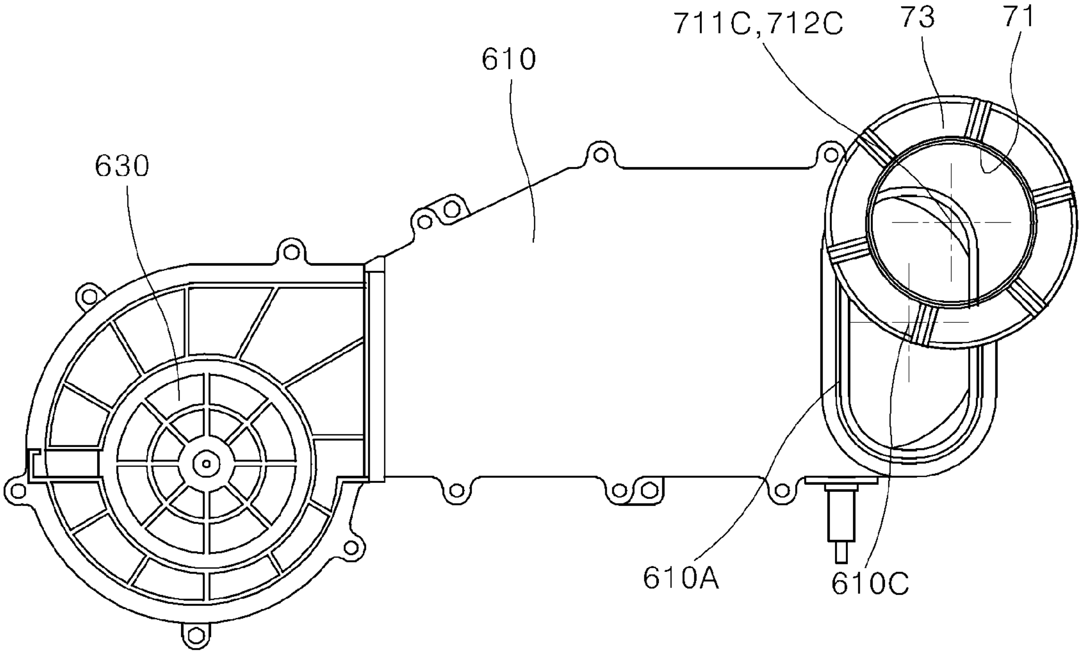
FIG. 12 is a plan view illustrating an example state in which the bottom member is omitted in FIG. 11.
Figure 13:
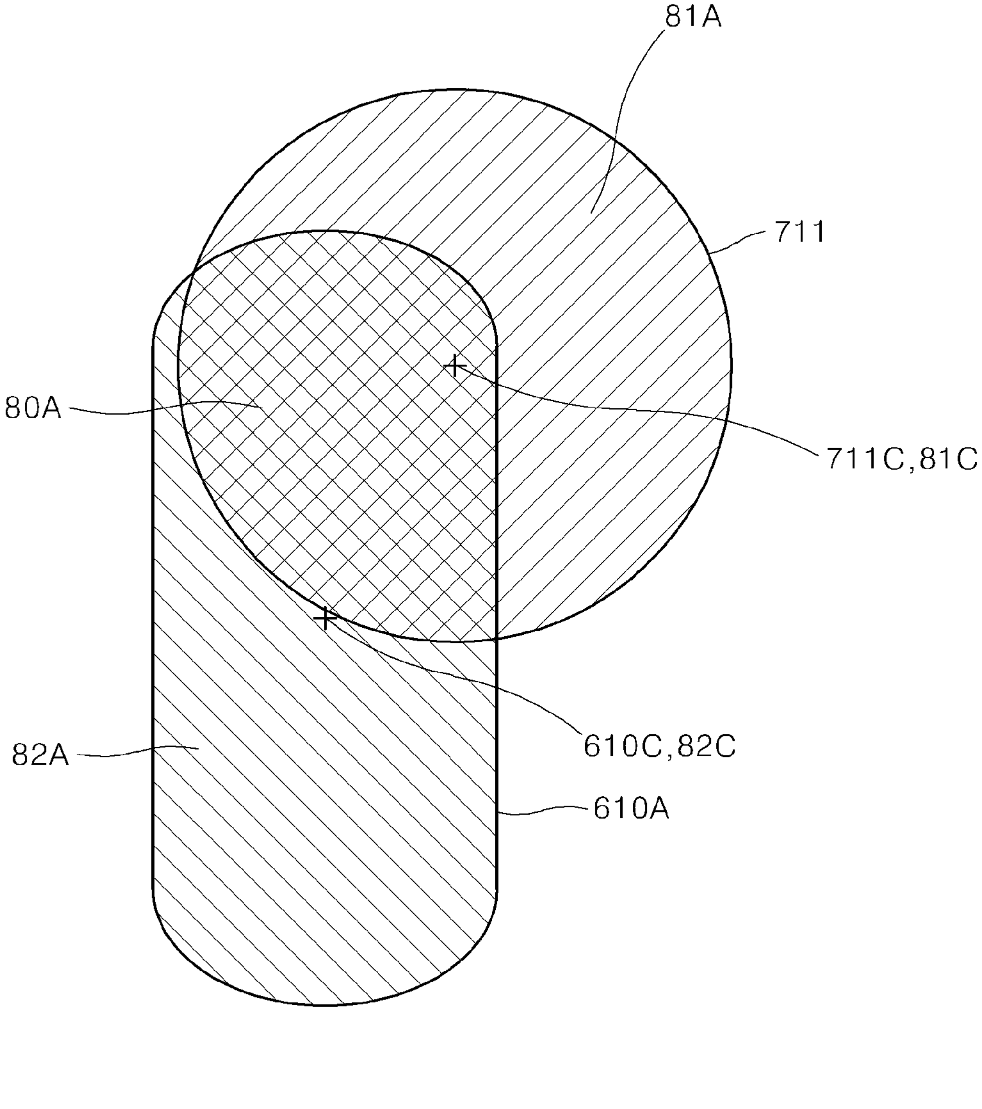
FIG. 13 is a plan view illustrating an example of an overlapping state of a flow cross section of a first opening and a flow cross section of a duct exit of the drying duct.
Figure 14:
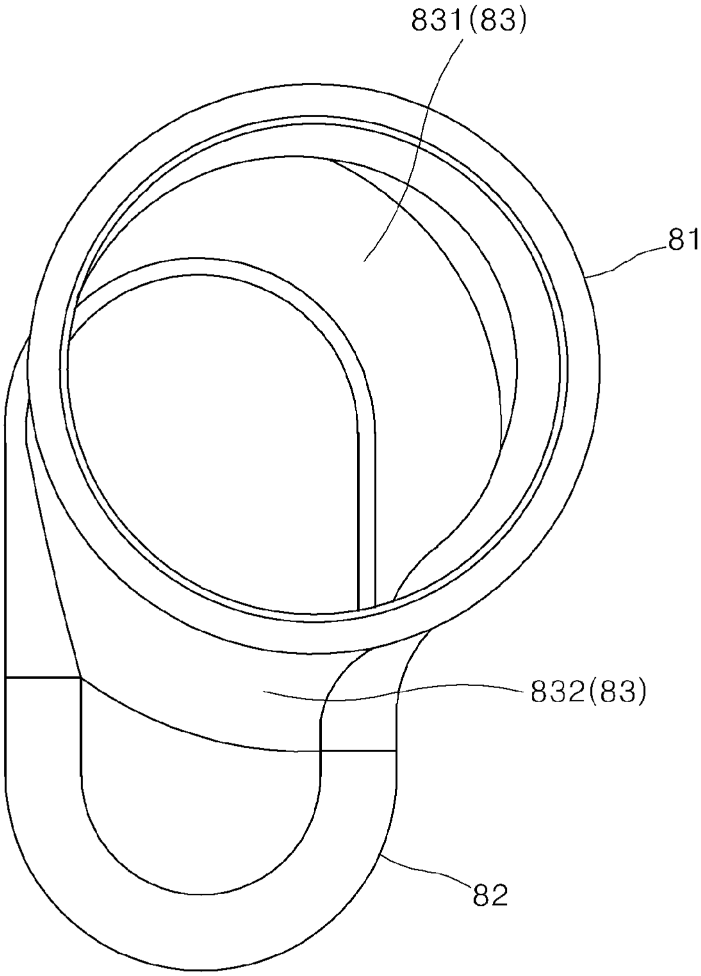
FIGS. 14 and 15 are a plan view and a side view, respectively, illustrating the connector.
Figure 15:
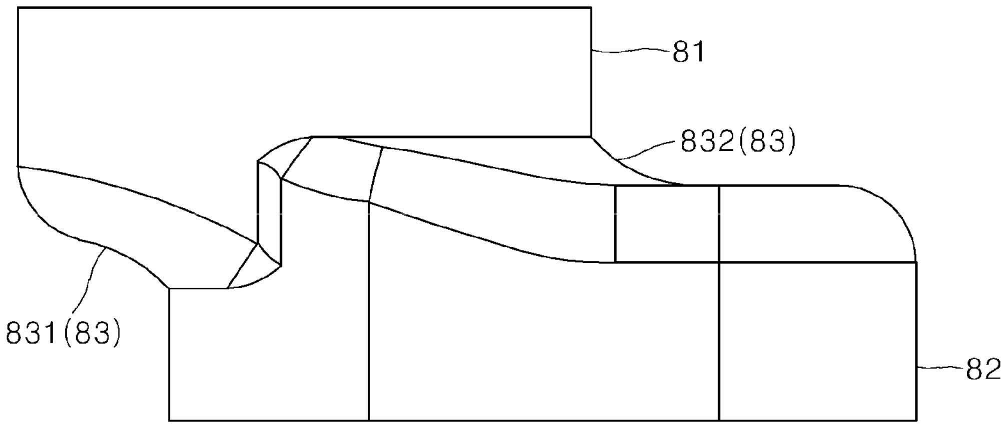

FIG. 11 is a front view illustrating the nozzle 71 and drying duct 610 in a state in which the connector is omitted. FIG. 12 is a plan view illustrating an example state in which the bottom member 22B is omitted in FIG. 11. FIG. 13 is a plan view illustrating an example of an overlapping state of a flow cross section of the first opening 711 and the flow cross section of the duct exit 610A of the drying duct 610. FIGS. 14 and 15 are a plan view and a side view illustrating the connector 80.

Referring to FIG. 11, an upper end of the duct exit 610A is disposed at a lower level than a lower end of the nozzle 71. This is a structure capable of minimizing a change in a direction of an air flow path from the duct exit 610A to the nozzle 71. For example, when a level of the upper end of the duct exit 610A is higher than the lower end of the nozzle 71, the direction of air flowing from the duct exit 610A to the nozzle 71 should be changed for the air to flow downward, which can cause an increase in a flow resistance. However, when the upper end of the duct exit 610A is disposed at a lower level than the lower end of the nozzle 71 as described above, the direction of the air flowing from the duct exit 610A to the nozzle 71 can be maintained so that the air may not need to flow downward again.

The duct exit 610A of the drying duct 610 and the first opening 711 of the nozzle 71 are disposed to be spaced apart from each other in the vertical direction and/or the lateral direction and are connected through the connector 80.

A central axis 610C of the flow cross section defined by the duct exit 610A extending in the third direction can be parallel to the flow cross section central axis 711C of the first opening 711. For example, a flow direction of air flowing upward from the duct exit 610A can be maintained in the first opening 711 without changing.

In some examples, the central axis 610C of the duct exit 610A is disposed to be misaligned with the central axis 711C of the first opening 711. Referring to FIGS. 12 and 13, the central axis 711C of the first opening 711 is disposed to be misaligned with the central axis 610C in a long axis direction of the duct exit 610A and also disposed to be misaligned with the central axis 610C in a short axis direction of the duct exit 610A.

When the duct exit 610A and the first opening 711 are disposed so that centers thereof are misaligned, deformation of the connector 80 connecting the duct exit 610A and the first opening 711 can be easily induced even when the duct exit 610A is relatively moved with respect to the first opening 711 in the third direction by an external force such as an impact applied to the dish washer.

For example, when the duct exit 610A has a circular shape, the first opening 711 has a circular shape having the same size as that of the duct exit 610A, and the center of the duct exit 610A and the center of the first opening 711 are aligned with each other in the third direction, the connector 80 can be formed in a simple circular pipe shape. In this case, even when the connector 80 is formed of a flexible material such as rubber, relative movement of the duct exit 610A with respect to the first opening 711 can be considerably transmitted to the first opening 711 through the connector 80. This causes a result of the impact being transmitted to the nozzle 71 even when the connector 80 is formed of the flexible material. Accordingly, it can be considered that the connector 80 is formed in a corrugated pipe form which easily stretches in a longitudinal direction. However, the corrugated pipe shape has a disadvantage in that the flow resistance increases considerably.

However, when the center of the duct exit 610A and the center of the first opening 711 are disposed to be misaligned, even when the connector 80 connecting the duct exit 610A and the first opening 711 is formed in a smooth pipe shape, when the duct exit 610A moves upward toward the first opening 711, or the duct exit 610A moves downward away from the first opening 711, deformation of the connector 80 connecting the duct exit 610A and the first opening 711 can be easily induced. That is, since the connector 80 secures a certain degree of stiffness in the third direction but is very flexible in the lateral direction, even when the duct exit 610A relatively moves with respect to the first opening 711, the connector 80 can be deformed and can absorb the impact.

For instance, a center of the flow cross section of the duct exit 610A and a center of the flow cross section of the first opening 711 are misaligned with each other when an extension line of a central axis of the flow cross section of the duct exit 610A is offset from an extension line of a central axis of the flow cross section of the first opening 711.

That is, even when the extension line of the central axis of the flow cross section of the duct exit 610A and the extension line of the central axis of the flow cross section of the first opening 711 meet at any one point, and when the extension line of the central axis of the flow cross section of the duct exit 610A is not the same as the extension line of the central axis of the flow cross section of the first opening 711, smooth deformation of the connector 80 can be expected as described above.

For example, the center of the flow cross section of the duct exit 610A and the center of the flow cross section of the first opening 711 are misaligned with each other when the extension line of the central axis of the flow cross section of the duct exit and the extension line of the central axis of the flow cross section of the first opening do not meet each other. That is, regardless of whether two extension lines are parallel, when two extension lines do not meet each other, the smooth deformation of the connector 80 can be expected as described above.

In some examples, even when the center of the duct exit 610A and the center of the first opening 711 are the same, when the shape of the duct exit 610A is different from the shape of the first opening 711, even when the connector 80 connecting the duct exit 610A and the first opening 711 is formed in the smooth pipe shape, a cross-sectional shape of the connector 80 extending in the third direction can be formed to be changed in the longitudinal direction. Since this shape can be flexibly changed in a certain degree in the lateral direction, the flow resistance can be minimized, and even when the duct exit 610A is relatively moved with respect to the first opening 711, the connector 80 can be deformed to absorb the impact.

In addition, even when the center of the duct exit 610A and the center of the first opening 711 are the same, and the shapes thereof correspond to each other, when a size of the duct exit 610A and a size of the first opening 711 are different from each other, even when the connector 80 connecting the duct exit 610A and the first opening 711 is formed in the smooth pipe shape, a cross-sectional area of the connector 80 extending in the third direction can be formed to be changed in the longitudinal direction. For example, when the duct exit 610A has a large circle, and the first opening 711 has a small circle, the connector 80 can have a shape like a cone. Since the shape can be flexibly deformed by a certain degree in the lateral direction unlike a circular pillar shape, the flow resistance can be minimized, and even when the duct exit 610A moves relatively with respect to the first opening 711, the connector 80 can be deformed to absorb the impact.

Accordingly, as in some implementations, when the shape of the duct exit 610A and the shape of the first opening 711 are different from each other, and the center of the flow cross section of the duct exit 610A and the center of the flow cross section of the first opening 711 are disposed to be misaligned with each other, even when the connector 80 connecting the duct exit 610A and the first opening 711 is formed in the smooth pipe shape, the connector 80 can be more easily and elastically deformed.

That is, according to conditions of the shapes, positions, and/or sizes of the duct exit 610A and the first opening 711, an inner surface of the connector can be formed in a smooth and flat or soft curved shape to reduce an air resistance and to also easily induce elastic deformation of the connector 80.

In some examples, the flow cross-sectional area of the first opening 711 can be greater than a flow cross-sectional area of the duct exit 610A. Accordingly, since the flow cross-sectional area of the connector 80 can be formed to increase in the longitudinal direction, a flow loss, which can be generated when the shape of the flow cross section is changed, can be minimized.

Referring to FIGS. 7 and 13 to 15, the connector 80 has the pipe shape. An upper end portion of the pipe shape of the connector 80 surrounds an outer circumference of the lower portion 71L of the nozzle 71 and constitutes the nozzle side connection end portion 81 connected to the nozzle 71. A shape of the nozzle side connection end portion 81 can be a circular pipe shape.

A lower end portion of the pipe shape of the connector 80 surrounds an outer circumference of the duct exit 610A of the drying duct 610 and constitutes the duct side connection end portion 82 connected to the drying duct 610. A shape of the duct side connection end portion 82 can be a track type pipe shape.

First, a cross-sectional shape of the nozzle side connection end portion 81 can be different from a cross-sectional shape of the duct side connection end portion 82 to correspond to a difference in shape between the flow cross section of the duct exit 610A and the first opening 711.

In addition, first, a central axis 81C of the nozzle side connection end portion 81 and a central axis 82C of the duct side connection end portion 82 may not be the same to correspond to a difference in central axis between the flow cross section of the duct exit 610A and the flow cross section of the first opening 711.

Referring to FIG. 13, when viewed from the vertical direction (the third direction), an overlap region 80A, in which an inner portion of the nozzle side connection end portion 81 overlaps an inner portion of the duct side connection end portion 82, is provided. When the overlap region 80A is present, a flow resistance generated due to the connector 80 in which a flow direction of air is changed in the longitudinal direction thereof can be minimized.

The inner portion of the nozzle side connection end portion 81 can include the overlap region 80A and a nozzle side unique region 81A which is not included in the overlap region. Similarly, the inner portion of the duct side connection end portion 82 can include the overlap region 80A and a duct side unique region 82A which is not included in the overlap region.

In the connector 80, a flow guide part 83 is disposed between the nozzle side connection end portion 81 and the duct side connection end portion 82. The flow guide part 83 can induce a change of the air flow direction because a central axis of the duct side connection end portion 82 may not match a central axis of the nozzle side connection end portion 81.

A first inclined guide surface 831 can be provided in a portion of the flow guide part 83 extending from the overlap region 80A of the duct side connection end portion 82 to the nozzle side unique region 81A of the nozzle side connection end portion 81. Due to the first inclined guide surface 831, a flow cross section of the connector 80 is expanded from a track shape to a circular shape.

In addition, a second inclined guide surface 832 can be provided in the portion of the flow guide part 83 extending from the duct side unique region 82A of the duct side connection end portion 82 to the overlap region 80A of the nozzle side connection end portion 81. Due to the second inclined guide surface 832, the flow cross section of the connector 80 is reduced from the track shape to the circular shape.

A cross-sectional area increased by the first inclined guide surface 831 is greater than a cross-sectional area decreased by the second inclined guide surface 832. Accordingly, a flow resistance, which can be generated while an air flow direction is changed, can be minimized.

Since the connector 80 is formed of the material, for example, the rubber material, which is flexible and has high heat resistance and low thermal conductivity, the connector 80 can be prevented from being deformed by hot air heated while flowing in the drying duct 610, and heat of the drying duct 610 can also be blocked from being conducted to the nozzle 71. For example, when the drying duct 610 is directly connected to the nozzle 71, the heat of the drying duct 610 is directly conducted to the nozzle 71.

According to a layout of the connector 80 and the nozzle 71 and the drying duct 610 which are connected to the connector 80, in a state in which the drying unit 600 is connected to a lower portion of the tub 20, the connector 80, which is a connecting portion of the tub and the drying unit, can absorb or distribute an impact. In addition, the connector 80 prevents the heat of the drying duct 610 from being transmitted to the nozzle 71. Accordingly, even when the bottom member 22B of the tub 20 is manufactured to be thin, and a weight of the drying unit 600 is heavy, the tub 20 and the drying unit 600 can be prevented from being deformed or damaged, and even in a high temperature environment in the drying unit, durability of the connecting portion between the tub 20 and the drying unit 600 can be secured.

Figure 16:
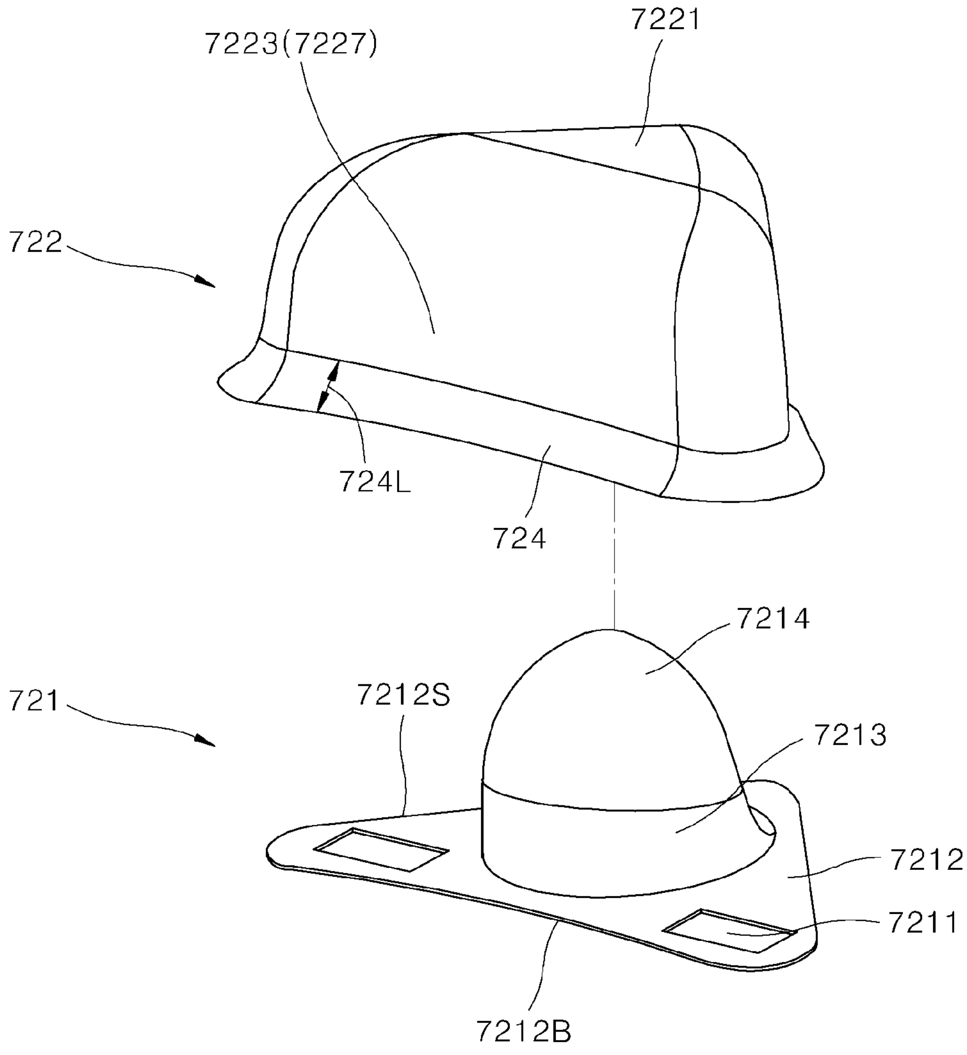
FIG. 16 is an exploded perspective front view illustrating an example of a distribution cap.
Figure 17:
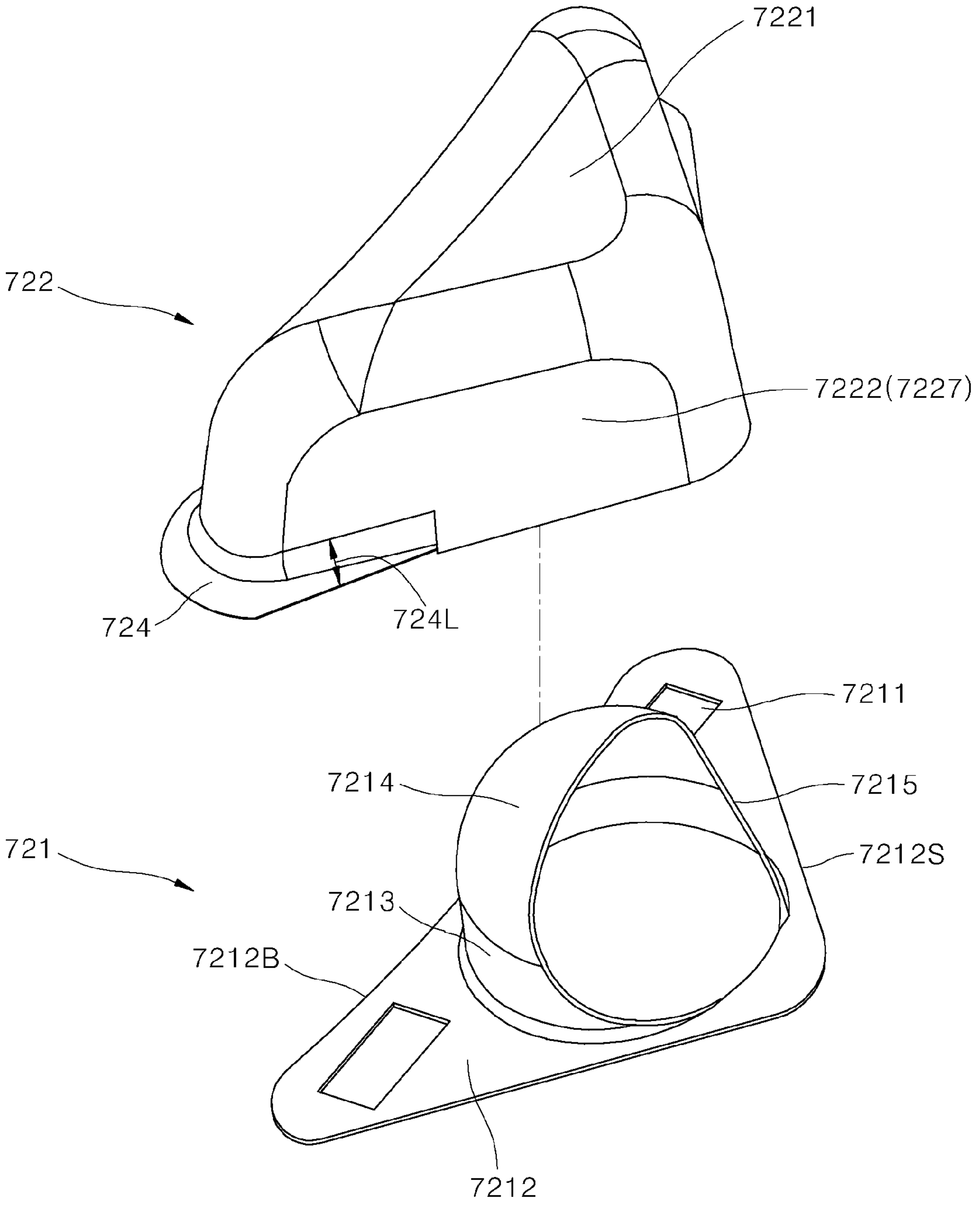
FIG. 17 is an exploded perspective rear view illustrating the distribution cap.
Figure 18:
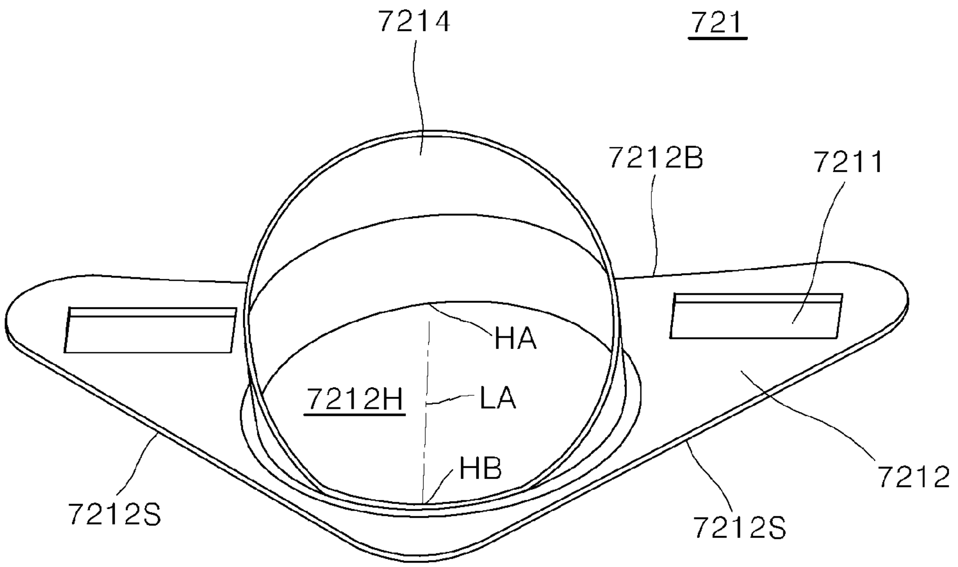
FIG. 18 is a perspective view illustrating an example of a lower cap of the distribution cap.
Figure 19:
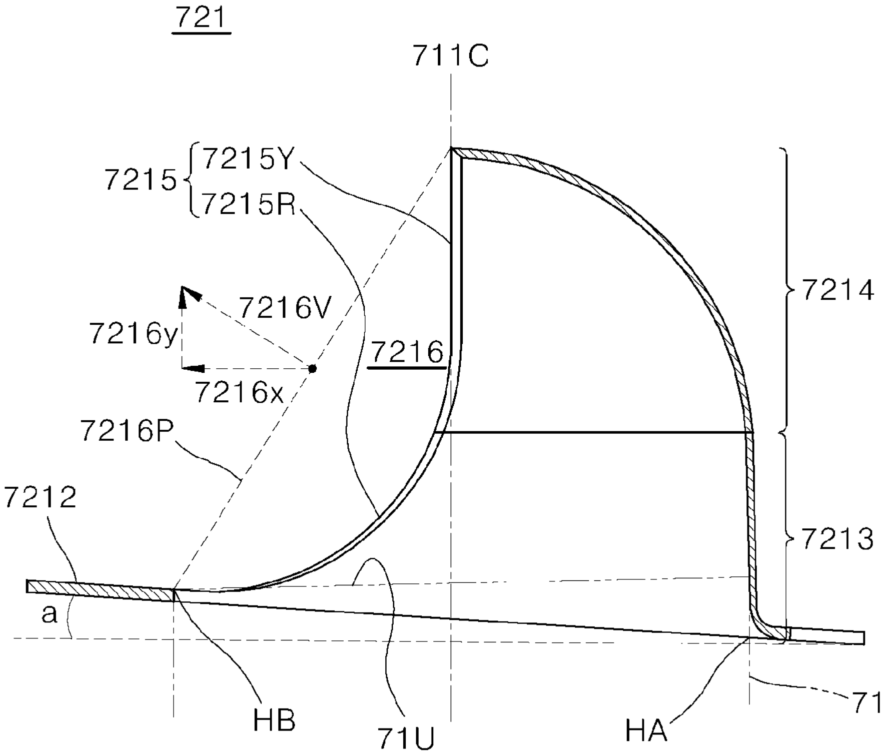
FIG. 19 is a side cross-sectional view illustrating the distribution cap.
Figure 20:
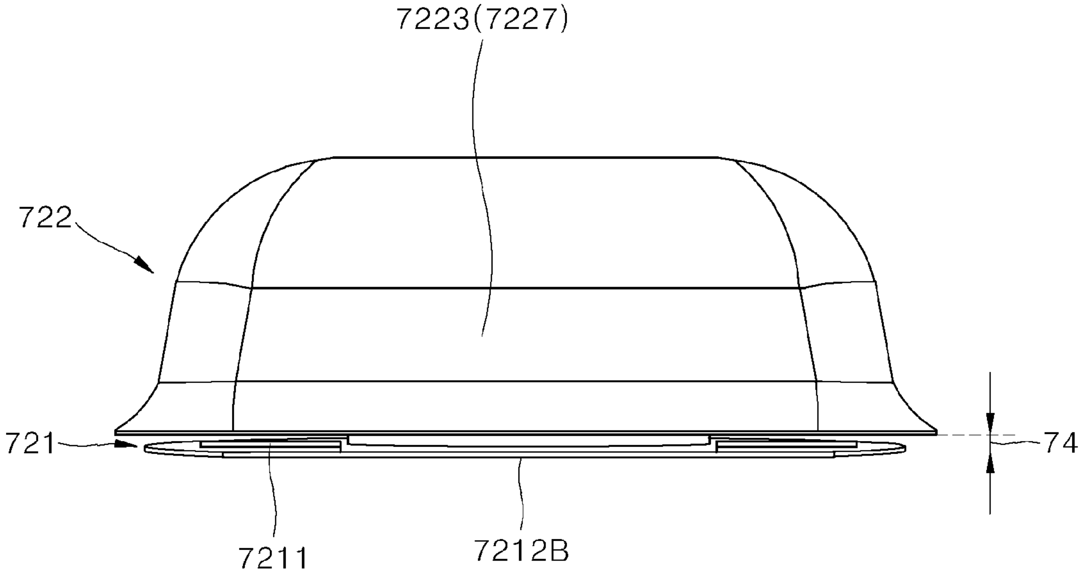
FIG. 20 is a rear view illustrating the distribution cap.
Figure 21:
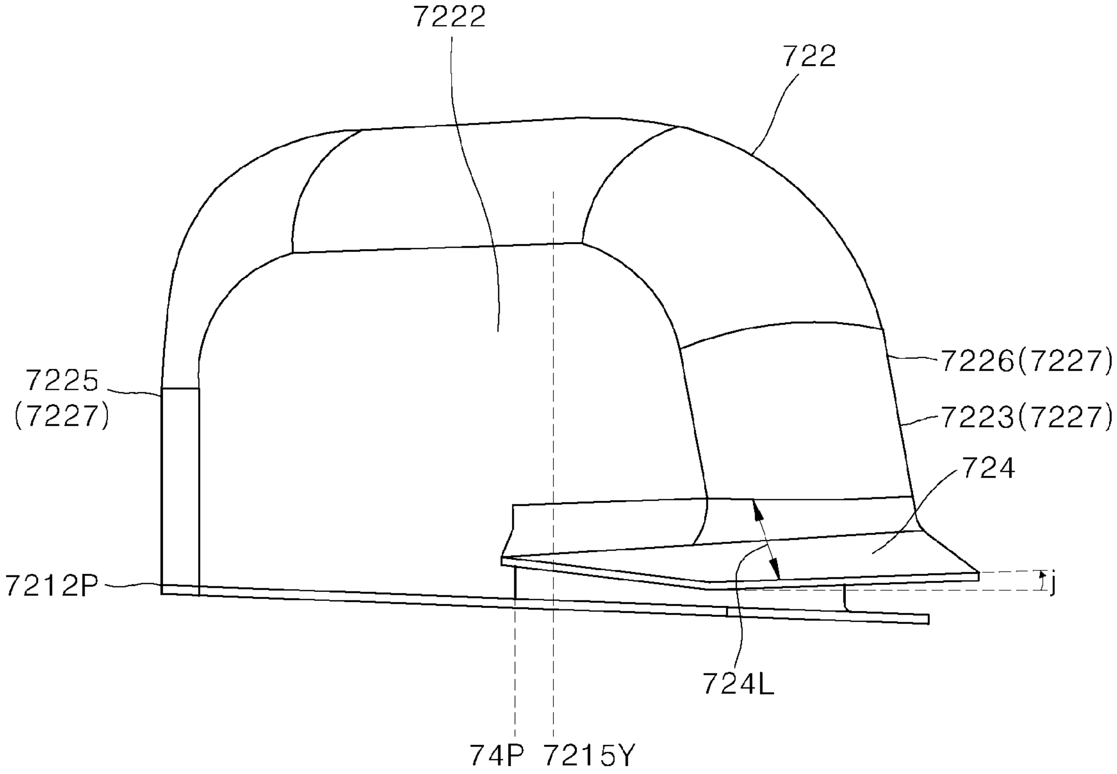
FIG. 21 is a side view illustrating the distribution cap.
Figure 22:
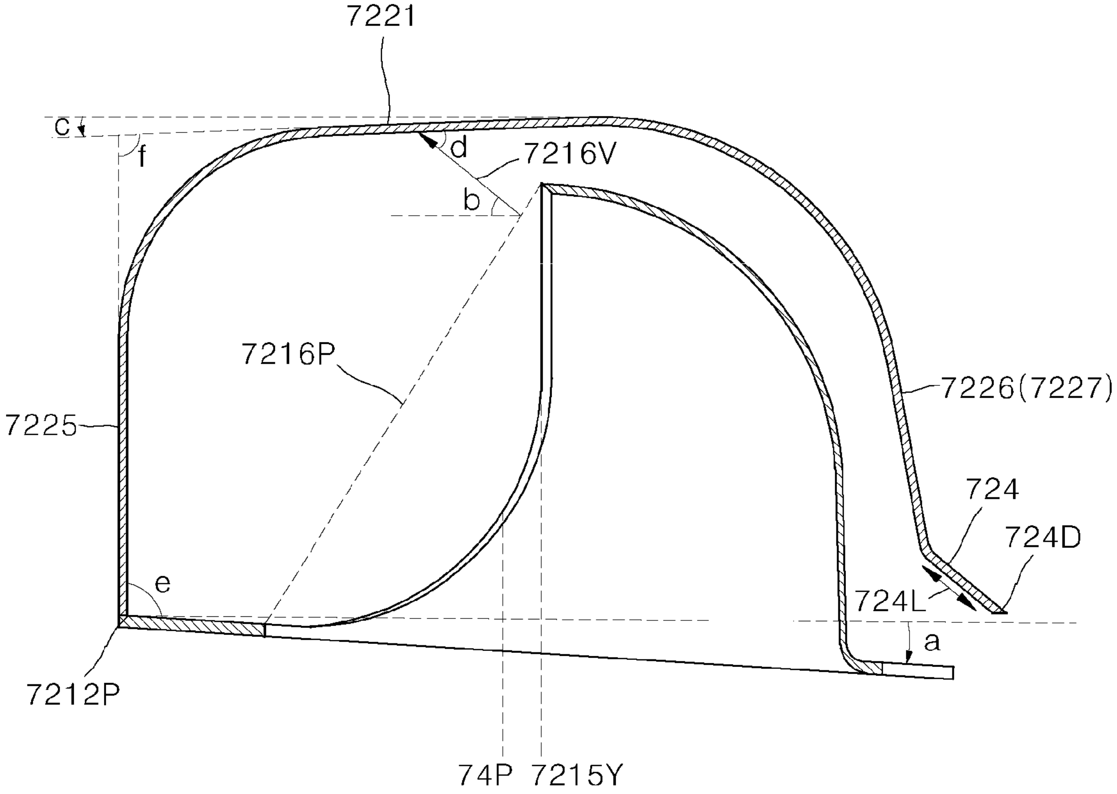
FIG. 22 is a side cross-sectional view illustrating the distribution cap.

FIG. 16 is an exploded perspective front view illustrating an example of a cap 72 or a distribution cap 72, FIG. 17 is an exploded perspective rear view illustrating the distribution cap 72, FIG. 18 is a perspective view illustrating a lower cap 721 of the distribution cap 72, FIG. 19 is a side cross-sectional view illustrating the distribution cap 72, FIG. 20 is a rear view illustrating the distribution cap 72, FIG. 21 is a side view illustrating the distribution cap 72, and FIG. 22 is a side cross-sectional view illustrating the distribution cap 72.

The distribution cap 72 is coupled to the nozzle 71 in order to prevent wash water from being introduced through the second opening 712 provided in an upper portion of the nozzle 71. In addition, the distribution cap 72 serves to diffusely discharge dry air so that the dry air discharged from the nozzle 71 is uniformly supplied to the washing space 22S in the tub 20.

In some examples, in the distribution cap 72, a path through which the air is introduced from the nozzle 71 is provided, a shape or guide for uniformly distributing the air from the nozzle 71 is provided, and a discharge opening 74 through which the distributed dry air is discharged is provided.

In some examples, the second opening 712 of the upper portion 71U of the nozzle 71 has the circular cross-section and is open upward. The distribution cap 72 prevents the wash water from being introduced through the second opening 712 during a process in which the dish washer washes the dish, receives dry air through the second opening 712, and uniformly distributes and discharges the received dry air to the washing space in the tub 20.

For example, as illustrated in FIGS. 5, 16, and 17, the distribution cap 72 can be formed by separately manufacturing and coupling the lower cap 721 and an upper cap 722. The lower cap 721 and the upper cap 722 can be manufactured through one of various methods such as a method of injection molding a synthetic resin or bending or pressing a metal sheet.

An inner space defined by the lower cap 721 and the upper cap 722 constitutes a path through which the dry air supplied from the nozzle 71 is discharged to the washing space of the tub 20.

The distribution cap 72 is coupled to the nozzle 71.

The lower cap 721 of the distribution cap 72 can be coupled to the upper portion 71U of the nozzle 71. The lower cap 721 can surround an outer circumference of the upper portion 71U of the nozzle 71 so that the upper portion 71U of the nozzle 71 can be inserted into the lower cap 721, and accordingly, the second opening 712 of the nozzle 71 can be present in the inner space of the distribution cap 72.

The upper cap 722 covers a space on the nozzle 71 to prevent the wash water from being introduced into the second opening 712.

The upper cap 722 includes an upper shell 7221 and sidewall shells 7227, and lower end portions of the sidewall shells 7227 can be coupled to an edge of the lower cap 721.

Accordingly, the upper cap 722 is fixed to be spaced apart from the nozzle 71.

The lower cap 721 includes a plate member 7212 which defines a lower end portion of the inner space defined by the distribution cap 72, a fitting pipe 7213 coupled to the nozzle 71, and a flow cover 7214 provided on the fitting pipe 7213.

The flow cover 7214 blocks the wash water from being introduced into the second opening 712 of the nozzle 71 and changes a flow direction of the air supplied from the nozzle 71.

The plate member 7212 constitutes a bottom of the inner space of the distribution cap to block the wash water from being introduced into the inner space. Accordingly, the wash water is prevented from being introduced into the nozzle 71.

The plate member 7212 can have a shape of a substantially isosceles triangle. The substantially isosceles triangle means that an overall external shape thereof is thought of as an isosceles triangle but is not an exact isosceles triangular shape.

Referring to the drawings, the plate member 7212 is reminiscent of an obtuse isosceles triangular shape. A portion of a vertex 7212P constituting an obtuse angle constitutes an angle between two oblique sides 7212S. In addition, a base side 7212B facing the vertex 7212P having the obtuse angle has a curved shape slightly recessed inward a triangle. In addition, portions of three vertices are rounded with curved lines having corresponding radii. However, as seen from the drawings, the plate member 7212 is sufficient to be reminiscent of the obtuse isosceles triangle as a whole.

Cap holes 7211 are provided in the plate member 7212 around two base angles having acute angles. The cap holes 7211 are paths through which the wash water introduced into the inner space of the distribution cap 72 through the discharge opening 74 of the distribution cap 72 is discharged. Since the wash water introduced into the inner space of the distribution cap 72 eventually falls on the plate member 7212, when the cap holes 7211 are disposed at a lower side of an inclined surface of the plate member 7212 by arranging the plate member 7212 to be inclined in a direction in which the cap holes 7211 are provided, discharge of the introduced wash water can be facilitated.

The vertex 7212P having the obtuse angle of the obtuse isosceles triangle has a shape suitable for distributing the dry air supplied from the nozzle 71 to two sides, and the widely open oblique sides 7212S has a shape suitable for diffusing the distributed dry air to two sides.

In addition, since the base side 7212B of the obtuse isosceles triangle has a longest length among the three sides, when the discharge opening 74 is formed to extend in a longitudinal direction of the base side 7212B, the dry air can be widely dispersed and discharged by as much as the discharge opening 74.

Accordingly, the dry air supplied from the nozzle 71 flows toward the vertex 7212P first, is divided at the vertex 7212P, is guided by isosceles to flow toward the base side 7212B, and is discharged to the washing space 22S of the tub 20, and thus a flow resistance can be minimized, and the dry air can be uniformly discharged into the washing space.

In some examples, the second opening 712 of the nozzle 71 is open upward. That is, the shape of the nozzle 71 may not control or change a direction of the dry air while guiding the dry air to flow upward. In addition, the direction of the dry air supplied upward from the nozzle 71 can be changed by the fitting pipe 7213 and the flow cover 7214 of the lower cap 721.

When the direction of the dry air is determined by the shape of the nozzle 71, directions of the nozzle 71 and the distribution cap 72 should be accurately aligned, and the nozzle 71 and the distribution cap 72 should be coupled when the nozzle 71 is coupled to the distribution cap 72. This causes inconvenience in an assembly process.

In some implementations, where the lower cap 721 changes the direction of the air supplied from the nozzle 71, the directions of the nozzle 71 and the distribution cap 72 may not need to be accurately aligned. That is, when the nozzle 71 is installed, the direction of the nozzle 71 may not need to be considered, and when the distribution cap 72 is installed on the nozzle 71, the directions of the nozzle 71 and the distribution cap 72 also may not need to be accurately aligned. In some implementations, it can be sufficient to set a direction in which the distribution cap 72 faces in the washing space of the tub 20 when the distribution cap 72 is installed on the nozzle 71.

In addition, since the plate member 7212 of the lower cap 721 has the obtuse isosceles triangular shape, when a shape, which allows the direction of the dry air supplied from the nozzle 71 to be changed, is provided in the plate member 7212, the direction of the dry air supplied from the nozzle 71 can be set very accurately.

Accordingly, in some implementations, the fitting pipe 7213 and the flow cover 7214 are integrally manufactured on a substantially central portion of the plate member 7212 having the isosceles triangular shape.

The fitting pipe 7213 is open downward. An extension direction of the fitting pipe 7213 can be the same as an extension direction of the nozzle 71, and a center of the fitting pipe 7213 can match a center of the nozzle 71.

As an example, an inner diameter of the fitting pipe 7213 corresponds to an outer diameter of the upper end of the nozzle 71. Accordingly, the fitting pipe 7213 can be fitted to an outer circumference of the nozzle 71. However, an outer circumferential surface of the fitting pipe 7213 can also be inserted into an inner circumferential surface of the nozzle 71, and in addition, one of various coupling methods can be applied.

The plate member 7212 is coupled in an inclined form at a predetermined angle a with respect to a plane perpendicular to a longitudinal direction of the fitting pipe 7213. In this case, the vertex 7212P of the plate member 7212 can be disposed at an upper side of the inclined surface, and the base sides 7212B of the plate member 7212 can be disposed at the lower side of the inclined surface.

The flow cover 7214 is formed on the fitting pipe 7213 to extend therefrom. The flow cover 7214 changes the direction of the dry air flowing upward due to the nozzle 71 to the lateral direction. In this case, the lateral direction can be a direction directed to the vertex 7212P from a circumference of the central axis 712C of the nozzle 71. In order to minimize a flow loss during this process, the flow cover 7214 is machined to have a smooth curved surface.

Since the plate member 7212, the fitting pipe 7213, and the flow cover 7214 can be integrally manufactured, the direction of the dry air discharged from the nozzle 71 can be accurately directed from a center of the obtuse isosceles triangle toward the obtuse angle.

The plate member 7212 has a shape extending outward from a circumference of the fitting pipe 7213 in a radial direction and can have a flat shape. Accordingly, the plate member 7212 can also minimize a resistance, guide a flow of the air, and allow the wash water, which can be present on the plate member 7212, to smoothly flow down along the inclined surface.

A predetermined fitting hole 7212H is provided in a center of the flat plate member 7212 by the fitting pipe 7213. The fitting hole 7212H can have a shape of an oval close to a circular shape in a flat surface of the flat plate member 7212. A long axis LA of the oval shape can match a direction in which the plate member 7212 is inclined.

Based on the long axis of the oval, an end portion, at which the fitting hole 7212H is closest to the vertex 7212P of the obtuse isosceles triangle, can be an open end portion HB, and an end portion, at which the fitting hole 7212H is closest to the base side 7212B of the obtuse isosceles triangle, can be a closed end portion HA.

The flow cover 7214 formed on the fitting pipe 7213 to extend therefrom blocks an upper portion at a side of the closed end portion HA of the fitting hole 7212H. Accordingly, the wash water, which can be introduced from the discharge opening 74 of the distribution cap 72 provided at a side of the base side 7212B of the obtuse isosceles triangle, is prevented from being introduced into the nozzle 71.

However, the flow cover 7214 formed on the fitting pipe 7213 to extend therefrom may not block an upper portion at a side of the open end portion HB of the fitting hole 7212H. Accordingly, the dry air discharged from the nozzle 71 can be discharged in a direction toward the vertex 7212P of the obtuse angle.

The flow cover 7214 can be formed by cutting a half of a shape of a substantial hemisphere at the side of the open end portion HB. That is, the flow cover 7214 can have a quarter sphere shape which covers a half of an upper portion above the fitting pipe 7213 at the side of the closed end portion HA of the fitting pipe 7213.

The fitting pipe 7213 can extend upward from the plate member 7212. In some implementations, it is illustrated that the fitting pipe 7213 extends only upward from the plate member 7212 but can also extend downward from the plate member 7212 in addition thereto.

A portion of the fitting pipe 7213 extending upward from the plate member 7212 can also have a shape cut at the side of the open end portion HB like the flow cover 7214. The shape can be a smooth curved shape cut from a lower end portion of a cut portion of the flow cover 7214 to the open end portion HB of the fitting hole 7212H.

Referring to FIG. 19, a cut line 7215 along which the flow cover 7214 and the fitting pipe 7213 are cut can include an upper line 7215Y along which the flow cover 7214 is cut and a lower line 7215R along which the fitting pipe 7213 is cut.

The upper line 7215Y can be a line along which the hemisphere is cut vertically from an upper end portion thereof. In addition, the lower line 7215R can be a smooth curved line connecting a lower end portion of the upper line 7215Y and the open end portion HB. As illustrated in FIG. 19, the lower line 7215R can have an arc shape having an angle of about 90 degrees when viewed laterally.

The lower line 7215R cut in the round shape in FIG. 19 may not be necessarily formed on the fitting pipe 7213. For example, as illustrated in FIG. 19, the lower line 7215R can also be formed on a part of the flow cover 7214. Alternately or in addition, the upper line 7215Y cut in the vertical shape in FIG. 19 can also be formed onto the fitting pipe 7213.

As illustrated in FIG. 19, the nozzle 71 can be inserted into the fitting hole 7212H of the plate member 7212. In a state in which the nozzle 71 is inserted into the fitting hole 7212H, the plate member 7212 is disposed to be inclined with respect to the nozzle 71.

The open end portion HB is disposed at a higher level than the closed end portion HA. The upper portion 71U of the nozzle 71 can be inserted into the fitting pipe 7213 to a level corresponding to the open end portion HB so that a discharge hole 7216 of the lower cap 721 defined by the cut line 7215 is not blocked by a circumferential surface of the nozzle 71.

For instance, the nozzle 71 can be inserted into the fitting pipe 7213 to the level so as not to block the discharge hole 7216. In other words, the nozzle 71 can be inserted the fitting pipe 7213 to the level not to cover the lower line 7215R.

In some implementations, the diameter of the fitting pipe 7213 and a diameter of the flow cover 7214 can be substantially constant in an upward direction from the plate member 7212. In some examples, the fitting pipe 7213 can include a section, in which the diameters of the fitting pipe 7213 and flow cover 7214 increase in the upward direction from the plate member 7212. Since the distribution cap 72 is coupled to the portion of the nozzle 71 exposed upward from the bottom member 22B of the tub 20, the diameters of the fitting pipe 7213 and the flow cover 7214 can be allowed to be greater than a diameter of the nozzle 71. This can be a structure capable of significantly reducing a flow resistance.

The discharge hole 7216, which is a path through which the air supplied from the nozzle 71 is supplied to the inner space of the distribution cap 72, is defined by the cut line 7215 provided on the fitting pipe 7213 and the flow cover 7214. In a speed vector of the dry air discharged through the discharge hole 7216, a horizontal component 7216*x* can be greater than a vertical component 7216*y*. That is, the horizontal component 7216*x* directed to the vertex 7212P of the obtuse angle can be greater than the vertical component 7216*y* directed upward.

Referring to FIG. 19, when a plane including an upper end portion and a lower end portion of the discharge hole 7216 defined by the lower cap 721 is referred to as a discharge cross section 7216P, an angle b (see FIG. 22) formed by a discharge cross section normal 7216V and the horizontal plane can be 45 degrees or less.

The upper cap 722 covers an upper portion of the lower cap 721 above the lower cap 721.

The upper cap 722 includes the upper shell 7221 which faces the plate member 7212 and is disposed at a higher level than the plate member 7212 and the sidewall shells 7227 connecting an edge of the upper shell 7221 and an edge of the plate member 7212.

The upper shell 7221 is also disposed to be spaced upward from the flow cover 7214.

The upper shell 7221 and the sidewall shells 7227 may not be directly connected to the nozzle 71 but can be indirectly connected thereto through the lower cap 721.

The upper shell 7221 can correspond to the obtuse isosceles triangle of the plate member 7212 and have an obtuse isosceles triangular shape aligned with the obtuse isosceles triangle of the plate member 7212. In this case, the isosceles triangular shape means a degree to which the shape is reminiscent.

Accordingly, the sidewall shells 7227 can include inclined surface shells 7222 corresponding to two isosceles of the isosceles triangle and a discharge surface shell 7223 corresponding to the base side of the isosceles triangle.

Portions in which the upper shell 7221, the inclined surface shells 7222, and the discharge surface shell 7223 are connected can be rounded with smooth curved surfaces. In order to form the smooth curved surfaces, radii arcs, which are rounded, can correspond thereto.

A lower end portion of a vertex of an obtuse angle of the isosceles triangle and a lower end section of the inclined surface shell 7222 adjacent to the vertex of the obtuse angle are fixedly connected to the edge of the plate member 7212. However, a lower end portion of the discharge surface shell 7223 and the lower end section of the inclined surface shell 7222 adjacent to the discharge surface shell 7223 are spaced apart from each other so as to form a predetermined gap therebetween instead of being connected to the edge of the plate member 7212. The gap can constitute the discharge opening 74 of the distribution cap 72.

Portions of the upper shell 7221 and the sidewall shells 7227, which correspond to the vertex of the obtuse angle of the isosceles triangle, constitute a direction change end portion 7225 through which the air discharged from the nozzle 71 through the discharge hole 7216 is distributed and the direction of the air is changed. In addition, a side opposite thereto, that is, a side of the discharge surface shell 7223, constitutes a discharge end portion 7226 from which the air, of which the direction is changed at the direction change end portion 7225, is discharged.

The upper shell 7221 can be inclined downward in a direction from the discharge end portion 7226 toward the direction change end portion 7225.

The upper shell 7221 can have a flat shape and can be inclined at a predetermined angle c with respect to a horizontal plane. When the upper shell 7221 is inclined, even when the wash water falls on a surface of the upper shell 7221, the wash water flows down easily.

Referring to FIG. 22, the discharge cross section normal 7216V has the angle b of 45 degrees or less with respect to the horizontal plane. The angle d formed by the discharge cross section normal 7216V and the upper shell 7221 is the sum of two angles b and c. The angle d can also be 45 degrees or less. Then, a flow of the dry air discharged through the discharge hole 7216 can be naturally guided to the direction change end portion 7225 due to the upper shell 7221.

The upper shell 7221 is inclined toward the direction change end portion 7225. In addition, as illustrated in FIGS. 21 and 22, the sidewall shell 7227 at a side of the direction change end portion 7225 extends in a substantially vertical direction. Accordingly, an angle f formed by the upper shell 7221 and the sidewall shell 7227 at the side of the direction change end portion 7225 can be an obtuse angle. In addition, the upper shell 7221 and the sidewall shell 7227 can be largely rounded and connected. Accordingly, the direction of the dry air guided to the direction change end portion 7225 by the upper shell 7221 can naturally start to change.

In addition, since the plate member 7212 is inclined at the predetermined angle a in a direction toward the discharge end portion 7226, an angle e formed by the sidewall shell 7227 at the side of the direction change end portion 7225 and the plate member 7212 can also be an obtuse angle. This also guides a natural direction change.

The air discharged from the discharge hole 7216 can include air flowing horizontally and air obliquely flowing upward.

As described above, the air obliquely flowing upward is sequentially guided by the upper shell 7221, the sidewall shell 7227, and the plate member 7212 to flow to the discharge end portion 7226.

The air flowing horizontally is sequentially guided by the direction change end portion 7225, the inclined surface shell 7222, and the discharge surface shell 7223 of the sidewall shell 7227 to flow to the discharge end portion 7226. The discharge surface shell 7223 is obliquely inclined in a direction toward the discharge opening 74 unlike the direction change end portion 7225. Accordingly, the dry air guided by the discharge surface shell 7223 can flow downward and can be discharged to the washing space of the tub 20 through the discharge opening 74.

A lower end portion of the sidewall shell 7227 which defines the discharge opening 74 is bent outward to constitute an eave 724. The eave 724 prevents the wash water from being introduced into the inner space of the distribution cap 72 through the discharge opening 74 during a dish washing process.

The eave 724 can be formed downward in a direction away from the sidewall shell 7227.

Since the plate member 7212 is inclined at the predetermined angle a, and a level of a bent portion of the eave 724 is horizontal, a vertical gap of the discharge opening 74 can also gradually increase in a direction toward the discharge surface shell 7223 in a portion of the inclined surface shell 7222 and can be constant in a portion of the discharge surface shell 7223. Similarly, an eave protruding length 724L can gradually increase in the direction toward the discharge surface shell 7223 in the portion of the inclined surface shell 7222 and can be constant in the portion of the discharge surface shell 7223.

In some examples, since a horizontal length of the discharge opening 74 is considerably long, the distribution cap 72 is sufficient to discharge the dry air discharged from the nozzle 71 without a considerable flow resistance. In addition, the dry air supplied from the nozzle 71 can be widely spread and discharged into the tub 20.

In some examples, a level of a front end portion 724D of the eave 724 can be disposed to be higher than a level of the vertex 7212P of the plate member. Accordingly, the vertical gap of the discharge opening 74 can be prevented from being excessively decreased, and the discharge opening 74 can be prevented from being disposed at an excessively low position so that a flow resistance can be minimized.

Referring to FIGS. 21 and 22, a start position 74P of the discharge opening can be disposed closer to the direction change end portion 7225 than a position of the upper line 7215Y. Since the lower line 7215R, along which the fitting pipe 7213 is cut, constitutes a smooth curved line connected to the open end portion HB, the fitting pipe 7213, which is not cut, can block the wash water, about which there is a worry of being introduced into the discharge opening 74 through around the start position 74P of the discharge opening, from being introduced into the nozzle 71. Accordingly, a longer open length of the discharge opening 74 can be secured.

In some examples, the cap hole 7211 can become not only a discharge path of the wash water which can be generated during a process of washing but also an additional path through which the hot dry air is discharged.

Although the present disclosure has been described with reference to the accompanying drawings as described above, the present disclosure is not limited by the implementations and drawings illustrated in the present specification, and it is clear that the present disclosure is variously modified by those skilled in the art within a range of the technical spirit of the present disclosure. In addition, while the implementations of the present disclosure have been described, although the operational effects according to the structure of the present disclosure have not been clearly described, predictable effects according to the corresponding structure should also be recognized.

What is claimed is:

1. A cap configured to couple to a nozzle of a dish washer that is configured to supply air into a tub of the dish washer, the cap comprising:

a lower cap configured to couple to an upper end portion of the nozzle;

a flow cover configured to cover a part of the upper end portion of the nozzle; and an upper cap coupled to the lower cap and configured to, based on the cap being coupled to the nozzle, be spaced apart from and positioned above the nozzle and the flow cover, wherein the cap defines a discharge opening configured to discharge air supplied to an inner space of the cap through the nozzle, wherein the lower cap further comprises a coupling portion configured to couple to the nozzle and a plate member that extends outward from the coupling portion in a radial direction, and wherein the upper cap is coupled to the plate member and configured to cover the nozzle and the flow cover, the upper cap defining the inner space of the cap with the plate member.

2. The cap of claim 1, wherein the lower cap comprises a fitting pipe configured to couple to the nozzle, and wherein the flow cover is disposed at the lower cap and extends upward relative to an upper end portion of the fitting pipe, the flow cover covering a part of an upper portion of a flow cross section defined by the fitting pipe.

3. The cap of claim 2, wherein the discharge opening faces the part of the upper portion of the flow cross section covered by the flow cover, and wherein the flow cover has a hemispherical curved surface.

4. The cap of claim 3, wherein the flow cover defines a discharge hole surrounded by a cut line along a part of the flow cover and a part of the fitting pipe, the discharge hole being configured to provide air from the nozzle to the inner space of the cap, and wherein the cut line comprises an upper line along the part of the flow cover and a lower line along the part of the fitting pipe.

5. The cap of claim 4, wherein a discharge cross section of the discharge hole is defined by a plane connecting an upper end portion of the upper line and a lower end portion of the lower line, and wherein a normal direction of the discharge cross section is oriented upward with respect to a horizontal plane and defines an angle less than or equal to 45 degrees with respect to the horizontal plane.

6. The cap of claim 4, wherein a portion of the upper line defines an upper end portion of the hemispherical curved surface and extends downward in a vertical direction.

7. The cap of claim 4, wherein the plate member extends outward from the fitting pipe in the radial direction, and wherein the lower line is connected to the plate member.

8. The cap of claim 7, wherein the plate member defines a fitting hole in fluid communication with the fitting pipe, the fitting hole having a closed end portion that is covered by the flow cover and an open end portion that is open toward the discharge hole, and wherein the lower line has a curved shape extending from a lower end portion of the upper line to the open end portion.

9. The cap of claim 1, wherein the plate member is inclined with respect to a horizontal plane.

10. The cap of claim 9, wherein the plate member defines a cap hole configured to discharge wash water introduced into the inner space of the cap through the discharge opening, the cap hole passing through the plate member.

11. The cap of claim 10, wherein the discharge opening is defined by a gap between the plate member and the upper cap, the gap being defined at a position adjacent to the cap hole.

12. The cap of claim 1, wherein the plate member has an obtuse isosceles triangular shape having a vertex that defines an obtuse angle and a base side that faces the obtuse angle, wherein the plate member comprises the coupling portion disposed at a central portion of the plate member and configured to couple to the nozzle, and wherein an end of the plate member includes the vertex and is located vertically above the base side.

13. The cap of claim 1, wherein the upper cap comprises:

an upper shell disposed above the plate member and spaced apart from the plate member; and a sidewall shell that extends from an edge of the upper shell to the plate member and is connected to the plate member.

14. The cap of claim 13, wherein the upper shell is inclined downward relative to a horizontal plane and away from the discharge opening.

15. The cap of claim 14, wherein the upper shell is inclined at a predetermined angle with respect to the horizontal plane, wherein the lower cap defines a discharge hole facing an inner surface of the upper shell, wherein a discharge cross section of the discharge hole is defined by a plane connecting an upper end portion of the discharge hole and a lower end portion of the discharge hole, and wherein a normal direction of the discharge cross section defines an angle less than or equal to 45 degrees with respect to the inner surface of the upper shell.

16. The cap of claim 13, wherein the sidewall shell comprises:

a discharge end portion that defines the discharge opening; and a direction change end portion disposed at a position opposite to the discharge opening, the direction change end portion defining (i) a first angle greater than 90 degrees with respect to an upper surface of the upper shell and (ii) a second angle greater than 90 degrees with respect to the plate member, and wherein the coupling portion of the lower cap is disposed between the discharge end portion and the direction change end portion.

17. The cap of claim 16, wherein the plate member has a substantially obtuse isosceles triangular shape having a vertex that defines an obtuse angle, isosceles sides that extend from the vertex, and a base side that faces the vertex, wherein the sidewall shell comprises an inclined surface shell facing one of the isosceles sides and a discharge surface shell facing the base side, wherein the direction change end portion is defined by a portion of the sidewall shell connected to the vertex, and wherein the discharge opening is defined by a gap between the plate member and each of a lower end portion of the discharge surface shell and a lower end portion of the sidewall shell, the lower end portion of the sidewall shell being connected to the discharge surface shell.

18. The cap of claim 17, wherein the sidewall shell further comprises an eave that is curved from the lower end portion of the sidewall shell and that extends downward and away from the lower cap, the eave defining at least a portion of the discharge opening, and wherein an end portion of the eave is disposed vertically above the vertex of the plate member.

19. The cap of claim 17, wherein the lower cap defines a discharge hole facing an inner surface of the upper shell, and wherein the discharge opening extends laterally inward relative to an inner end of the discharge hole of the lower cap.

* * * * *